(12) United States Patent
Hayashi et al.

(10) Patent No.: US 6,185,007 B1
(45) Date of Patent: Feb. 6, 2001

(54) IMAGE FORMING APPARATUS

(75) Inventors: Koji Hayashi; Takashi Bisaiji; Katsuhisa Tsuji, all of Kanagawa; Kazumi Kuwata, Tokyo, all of (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/135,841

(22) Filed: Aug. 18, 1998

(30) Foreign Application Priority Data

Aug. 20, 1997 (JP) .................................................. 9-275003

(51) Int. Cl.$^7$ ........................................................ G03F 3/08
(52) U.S. Cl. .......................................... 358/1.9; 358/521
(58) Field of Search .................................. 358/518, 521, 358/523, 458, 406, 504, 455, 1.9

(56) References Cited

U.S. PATENT DOCUMENTS

| | | |
|---|---|---|
| 5,057,914 | 10/1991 | Tsuji et al. . |
| 5,077,615 | 12/1991 | Tsuji . |
| 5,305,057 | * 4/1994 | Hattori et al. .......................... 358/458 |
| 6,055,071 | * 4/2000 | Kuwata et al. ........................ 358/521 |
| 6,061,144 | * 5/2000 | Mamizuka ............................. 358/1.9 |

FOREIGN PATENT DOCUMENTS 7-264411   10/1995   (JP) .

\* cited by examiner

*Primary Examiner*—Thomas D. Lee
(74) *Attorney, Agent, or Firm*—Oblon, Spivak, McClelland, Maier & Neustadt, P.C.

(57) ABSTRACT

When an ACC menu is called out on a liquid crystal screen of an operating section, the screen shown in FIG. 19 is displayed. When "Execution" of automatic color calibration for use of a copying function is selected, the screen in FIG. 20 is displayed. When it is desired to use the copying function, a gradation calibration table used when the copying function is changed with reference to the deference data. When Print Start key in FIG. 20 is selected, a plurality of density gradation patterns corresponding to colors of YMCK as well as to a plurality of image quality mode such as characters and pictures are formed on a transfer material. The density gradation patterns are previously stored and set in a ROM of an IPU. A write value for a pattern is changed according to a result of detection of the development characteristics.

6 Claims, 27 Drawing Sheets

TONER PATTERN

K C M Y  K C M Y
PICTURE MODE    CHARACTER MODE

MARK FOR SPECIFYING POSITION

TRANSFER PAPER

AUTOMATIC GRADATION CALIBRATION

CANCEL

| t \ s | R | G | B |
|---|---|---|---|
| K | 1.00 | 1.00 | 1.00 |
| C | 1.05 | 1.00 | 0.95 |
| M | 1.00 | 1.00 | 1.00 |
| Y | 1.00 | 1.00 | 0.95 |

FIG.30

$$\begin{Bmatrix} Y \\ M \\ C \end{Bmatrix} = \begin{bmatrix} a11 & a12 & a13 \\ a21 & a22 & a23 \\ a31 & a32 & a33 \end{bmatrix} \begin{Bmatrix} *B \\ *G \\ *R \end{Bmatrix}$$

IMAGE FORMING APPARATUS

FIELD OF THE INVENTION

The present invention relates to a method of calibrating a corrected gradation curve for gradation conversion of image data used for image processing in image forming apparatuses such as a copying machine, a printer, or a facsimile machine each based on the digital system, and to an image forming apparatus using the method therein.

BACKGROUND OF THE INVENTION

Conventionally, in an image forming apparatus based on the digital system, for calibrating output characteristics of an output device such as a printer (image forming unit) and also for emphasizing an area having particular density, there has been used an image signal conversion table (Look-Up Table and described as LUT hereinafter).

An image forming apparatus generally comprises an image reading unit, an image processing unit, an image writing unit, and image output unit, and the LUT described above is incorporated in the image processing unit and converts an input image signal inputted from the image reading unit to the image processing unit and outputs the converted image signal as an output image signal to the image writing unit.

This LUT utilizes the output characteristics such as density of an image outputted from a printer, so that, when output characteristics of the printer changes due to "degradation or contamination" of the image forming unit or other related sections, the LUT can not play a role for calibration.

To overcome this problem, as a control generally called as process control executed in an image forming apparatus, sometimes a plurality of patterns each having a different image density are formed on an image carrier such as a light-sensing body or a transfer member, a reflected light from or a transmitting light through the patterns is detected, and such parameters as a charged potential, a development bias, or a exposure rate of a laser are changed or the gradation calibration table is changed according to a result of the detection above.

The calibrating method described above provides the merit that calibration is automatically executed in an image forming apparatus without requiring manual labor of an operator, but because of the characteristics of an optical sensor, there is no sensibility in the high density side where a deposition rate of toner is high, and calibration is made only in a range from a low density area to an intermediate density area where a toner deposition rate is rather low. Also with the calibrating method above, fluctuation in a quantity of transferred toner caused by gradually change of the transfer performance of a transfer section and fluctuation of image density due to change in the fixing capability in a fixing section can not be corrected.

In contrast, there is a method in which a pattern image formed on an image carrier and transferred and fixed on a transfer member is read with a scanner, and the gradation calibration table is selected or prepared according to the read data or a color conversion coefficient/RGB-YMCK color conversion table is prepared according to the read data. In this method, different from the calibrating method using an optical sensor described above, treatment by an operator such as manually placing a discharged transfer member on a document base or the like is required, but calibration of a high image density section where a toner deposition rate is high is possible, and also change of image density due to gradually change in performance of the transfer section as well as to change in the fixing capability in the fixing section can advantageously be corrected.

The invention disclosed in Japanese Patent Laid-Open Publication No. HEI 7-264411 relates to an image forming apparatus comprising a pattern forming unit for forming a gradation pattern on a recording member, a reading unit for reading the gradation pattern formed by the pattern forming unit, and a regulating unit for regulating conditions for image formation according to the gradation pattern read by the pattern reading unit, in which more gradation pattern steps are provided in a density area where the gradation characteristics is not linear as compared to those in other density areas. In this invention, the gradation patterns are fixed.

By the way, to execute regulation of image density, sometimes a gradation pattern is outputted onto transfer paper, the gradation pattern is read with a scanner, and the conversion characteristics of a gradation calibration table in an image processing section is decided according to the read gradation pattern. This operation is called automatic color calibration (ACC). In this step, to simplify processing executed no software and also to reduce a quantity of toner used for preparing a gradation pattern, it is necessary to precisely decide a gradation calibration table with a small number of gradation patterns.

When the number of gradation patterns is small, if a write value for gradation patterns is fixed, sometimes precision in regulation may not be stabilized due to effects by the development characteristics gradually changing. Description is made below for the reason with reference to FIG. 31.

In FIG. 31, a horizontal axis of the first quadrant indicates a laser write value for a gradation pattern, while a vertical axis indicates a gradation pattern read value outputted onto transfer paper, which indicates a relation between a gradation pattern write value and a scanner read value, and a horizontal axis of the second quadrant indicates a toner deposition rate on a light-sensing body, and this value indicates a relation between a toner deposition rate on the light-sensing body and a scanner read value. A vertical axis of the third quadrant indicates a development potential, which indicates a development characteristics of a printer. The development potential indicates a difference between a surface potential on the light-sensing body and a DC component of development bias, and the larger the value is, the higher a deposition rate of toner onto the light-sensing body is. The fourth quadrant indicates a relation between a development potential and a gradation pattern write value.

The reference numerals n (1) and n (2) on the horizontal axis of the first quadrant indicates write values in the first and second stages of a gradation pattern respectively, and herein a write value for a stage 0 of the gradation pattern is 0, which indicates a read value for background of the transfer paper.

The reference numerals g1) and h1) in the first quadrant show cases each having different development characteristics, and g1) indicates a case where a toner deposition rate onto a light-sensing body is large, and the case is indicated by the phrase of "Development rate is large" in the figure. The reference numeral h1) indicates a case where a toner deposition rate onto the light-sensing body is standard, and the case is indicated by the phrase of "Development rate is standard". Herein it is assumed that scanner read values to gradation pattern write values n [1], n [2] for the development characteristics of g1), h1) are Ag [n[1]], Ag [n[2]], Ah [n[1]], and Ah [n[2]]. As shown by the graph, Ag [n[1]] and Ah [n[1]] are substantially the same values. Assuming that the value is A [1], a difference value A [1]–Ag [n[2]] and A [1]–Ah [n[2]] for the read values in the first stage and second stage of the gradation pattern for the development characteristics g1), h1) correspond to (e) ΔAg [1] and (f) ΔAh [1] in the figure respectively. As understood from the figure, ΔAg [1] is larger than ΔAh [1], so that sometimes the error becomes larger when a gradation calibration table is prepared by estimating a laser write value between n [1] and n [2] by means of linear interpolation or spline interpolation.

SUMMARY OF THE INVENTION

It is a first object of the present invention to provide an image forming apparatus which can prepare a gradation calibration table with a small number of gradation patterns as well as with high precision in the case as described above.

It is a second object of the present invention to provide an image forming apparatus having gradation calibration tables in an image forming section and a printer section respectively capable of preparing a gradation calibration table with a small number of patterns as well as with high precision.

It is a third object of the present invention to provide an image forming apparatus which can prepare a gradation table having high precision adjustability with a small number of patterns by detecting development characteristics from a toner image developed on an image carrier and deciding a write value for a gradation pattern according to the detected development characteristics.

It is a fourth object of the present invention to provide an image forming apparatus which can prepare a YMCK gradation calibration table for excellent color balance and gradation by executing ACC by ways of detecting the development characteristics from a surface potential of a pattern formed as a latent image of an image carrier and reading a surface potential of the pattern formed as a latent image on a light-sensing body.

With the present invention, there is provided a detecting unit for detecting development characteristics, and gradation calibration tables for YMCK can be prepared at high precision with a small number of gradation patterns by changing a write value for the gradation patterns used for preparing the gradation calibration tables for YMCK according to the development characteristics.

With the present invention, a gradation calibration table for a printer section is formed according to the development characteristics and an output signal for the gradation pattern is converted by way of referring to the gradation calibration table for forming an image on transfer paper, so that a gradation calibration table can be prepared at high precision with a smaller number of gradation patterns.

With the present invention, a quantity of toner deposited on a carrier is detected by a light sensing unit, a plurality of gradation patterns each having a different write value are prepared according to the detected toner deposition rate, and the development characteristics is detected by reading the plurality of gradation patterns, so that a gradation calibration table with precision having high adjustability can be prepared with a small number of patterns.

With the invention, a latent image potential of a gradation pattern is detected not only by the light sensing unit, but also by a surface potential detecting unit, a YMCK gradation calibration table for reading a surface potential of a gradation pattern formed as a latent image on the image carrier and obtaining an excellent color balance and gradation can be obtained by executing ACC.

Other objects and features of this invention will become understood from the following description with reference to the accompanying drawings.

BRIEF DESCRIPTION OF THE DRAWINGS

FIG. 30 is a view showing matrix used for processing for color calibration; and

DESCRIPTION OF THE PREFERRED EMBODIMENTS

Next detailed description is made for presently preferable embodiments of the present invention with reference to FIG. 1 through FIG. 30.

Figure 1:
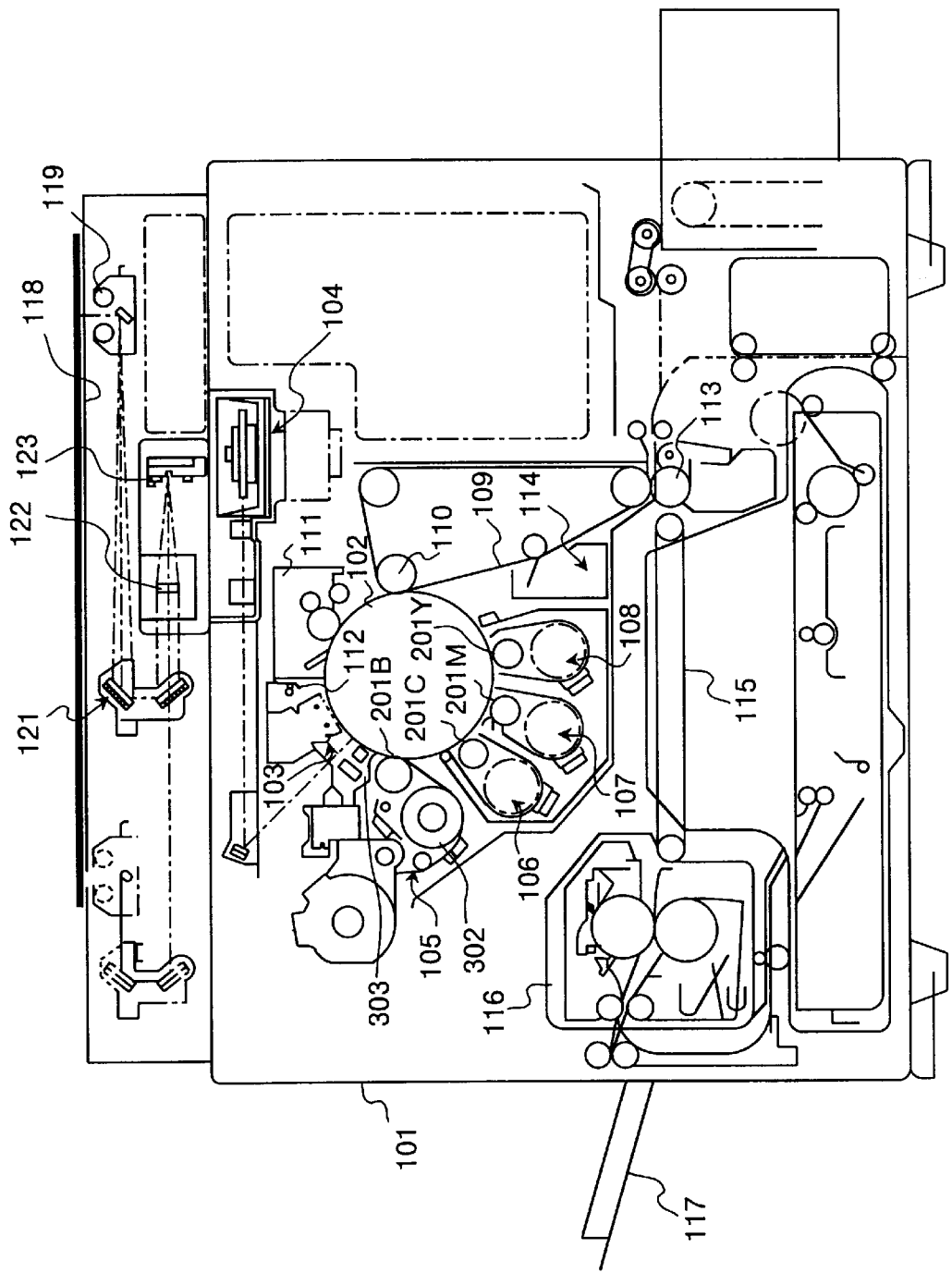
FIG. 1 is a block diagram showing a copying machine according to an embodiment of the present invention.

FIG. 1 is a block diagram showing a copying machine according to an embodiment of the present invention, and general description is made for a basic system of the copying machine 101 with reference to this figure. Provided around an organic light-sensing (OPC) drum 102 with a diameter of φ120 mm as an image carrier located at a substantially central section of the basic system of copying machine 101 are an electrifying charger 103 for electrifying a surface of the light-sensing drum 102; a laser optic system 104 for irradiating a semiconductor laser beam on a surface of the light-sensing drum 102 homogeneously electrified; a black-developing unit 105 and other three color developing units 106, 107, 108 for yellow Y, magenta M, and cyan C for obtaining a toner image for each color by supplying toner for each color to an electro-static latent image; an intermediate transfer belt 109 for successively transferring a toner image for each color formed on the light-sensing drum 102; a bias roller 110 for loading an transfer voltage onto the intermediate transfer belt 109; a cleaning device 111 for removing toner remaining on a surface of the light-sensing drum 102 after transfer of the latent image; a charge removing section 112 for removing a charge remaining on a surface of the light-sensing drum 102 after the transfer, and other related sections.

Also provided on the intermediate transfer belt 109 are a transfer bias roller 113 for loading a voltage for transferring the transferred toner image onto the transfer member and a belt cleaning device 114 for cleaning a toner image remaining there after transfer of the toner image onto the transfer member.

Arranged at an exit-side edge section of a carrier belt 115 for carrying a transfer member exfoliated from this intermediate transfer belt 109 is a fixing device 116 for loading heat and pressure to a toner image to fix it, and a paper discharge tray 117 is attached to an exit portion of this fixing device 116.

Provided on the laser optical system 104 are a contact glass 118 as a document base placed on the basic system of copying machine 101, an exposure lamp 119 for irradiating a scanning beam onto a document placed on this contact glass 118, and a reflected light from the document is guided by a reflection mirror 121 into an image-forming lens 122 and introduced into an image sensor array 123 of a CCD (Charged Coupled Device) which is an opto-electric conversion element. An image signal converted into an electric signal by the image sensor array 123 of the CCD controls laser oscillation of a semiconductor laser in the laser optical system 104 via an image processor not shown in the figure.

Figure 2:
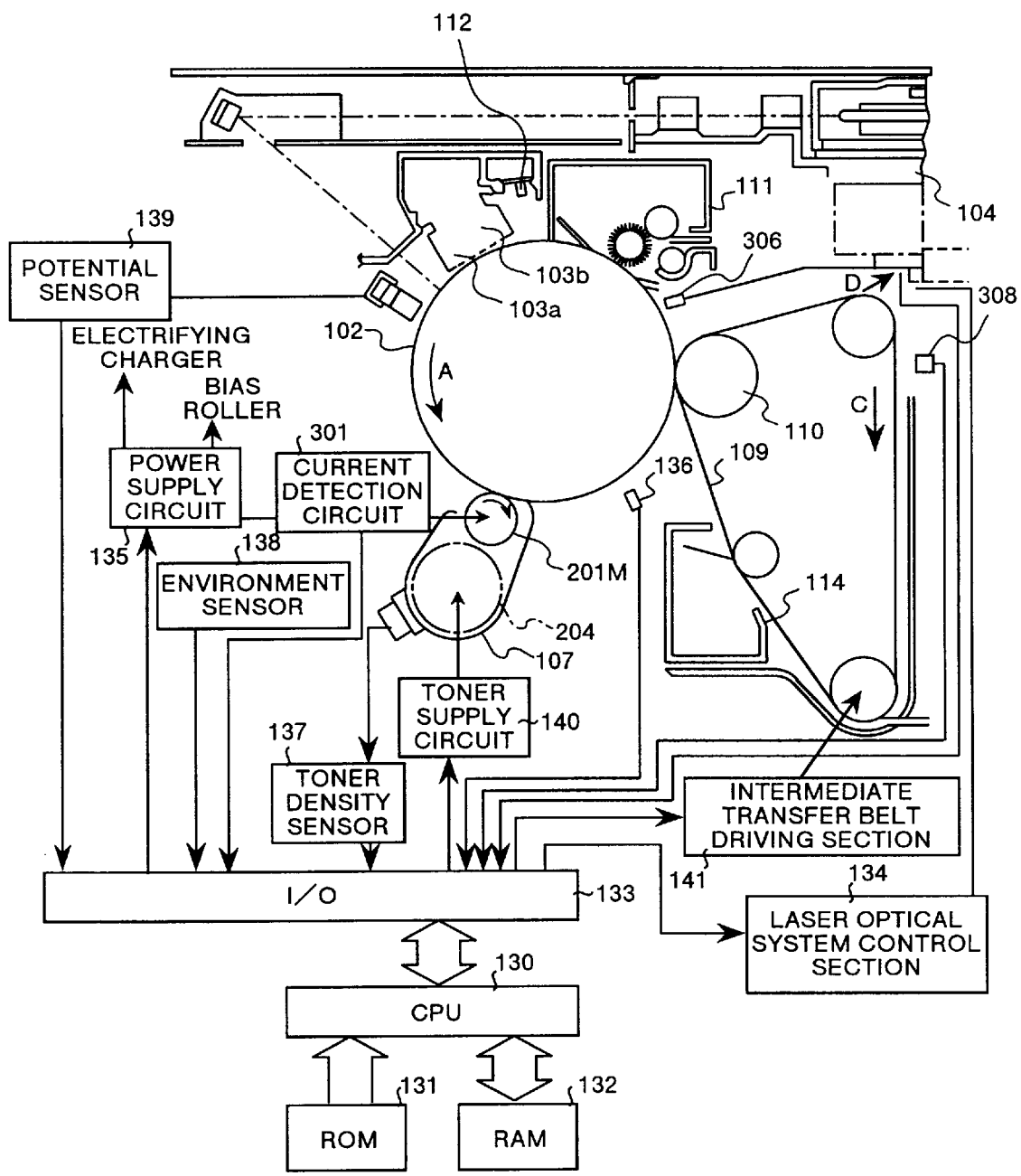
FIG. 2 is an explanatory view for illustrating a control system for a copying machine according to the present invention.

Then description is made for a control system incorporated in the copying machine described above. As shown in FIG. 2, the control system has a main control section (CPU) 130, and a specified type of ROM 131 and RAM 132 are provided for this main control section 130, and a laser optical system control section 134, a power supply circuit 135, an optical sensor 136, a toner density sensor 137, an environment sensor 138, a light-sensing body potential sensor 139, a toner supply circuit 140, and an intermediate transfer belt driving section 141 are connected via an interface I/O 133 to this main control section 130.

A laser optical system control section 134 adjusts laser output from the laser optical system 104. The power supply circuit 135 gives a specified voltage to the electrifying charger 113, gives development bias with a specified voltage to the developing units 105, 106, 107, 108, and also gives a specified voltage to the bias roller 110 as well as to the transfer bias roller 113.

The optical sensor 136 comprises a light-emitting element such as a light-emitting diode provided at a position close to an area onto which a toner image has been transferred from the light-sensing drum 102 and a light-receiving element such as a photo sensor, and a toner deposition rate on a toner image corresponding to a detected latent pattern image formed on the light-sensing drum 102 and that on the background section are detected for each color, and the so-called residual potential after electric charge is removed from the light-sensing body is detected.

A detected output signal from this optical sensor 136 is loaded to an optical sensor control section not shown in the figure. The optical sensor control section computes a ratio of a toner deposition rate of the detected pattern toner image vs that on the background section, detects fluctuation in image density by comparing the ratio value to a reference value, and corrects a control value for a toner density sensor 137.

The toner density sensor 137 detects toner density according to change of magnetic permeability of a developer existing in each of the developing units 105 to 108. The toner density sensor 137 has a function for comparing the detected toner density value to the reference value and loading, when the toner density is lower than a specified value and the toner is short, a toner supply signal having amplitude corresponding to the shortage to the toner supply circuit 140. The potential sensor 139 detects a surface potential of the light-sensing body drum 102 as an image carrier, and the intermediate transfer belt driving section 141 controls for driving the intermediate transfer belt.

A developer containing black toner and a carrier is accommodated in the black developing unit 105, the developer is agitated by rotation of a developer agitating member 202, and a volume of the developer pumped up to a sleeve by a developer regulating member is adjusted on the development sleeve 201B. The supplied developer is magnetically carried on the development sleeve 201B and is rotated as a magnetic brush in the rotating direction of the development sleeve 201B.

Figure 3:
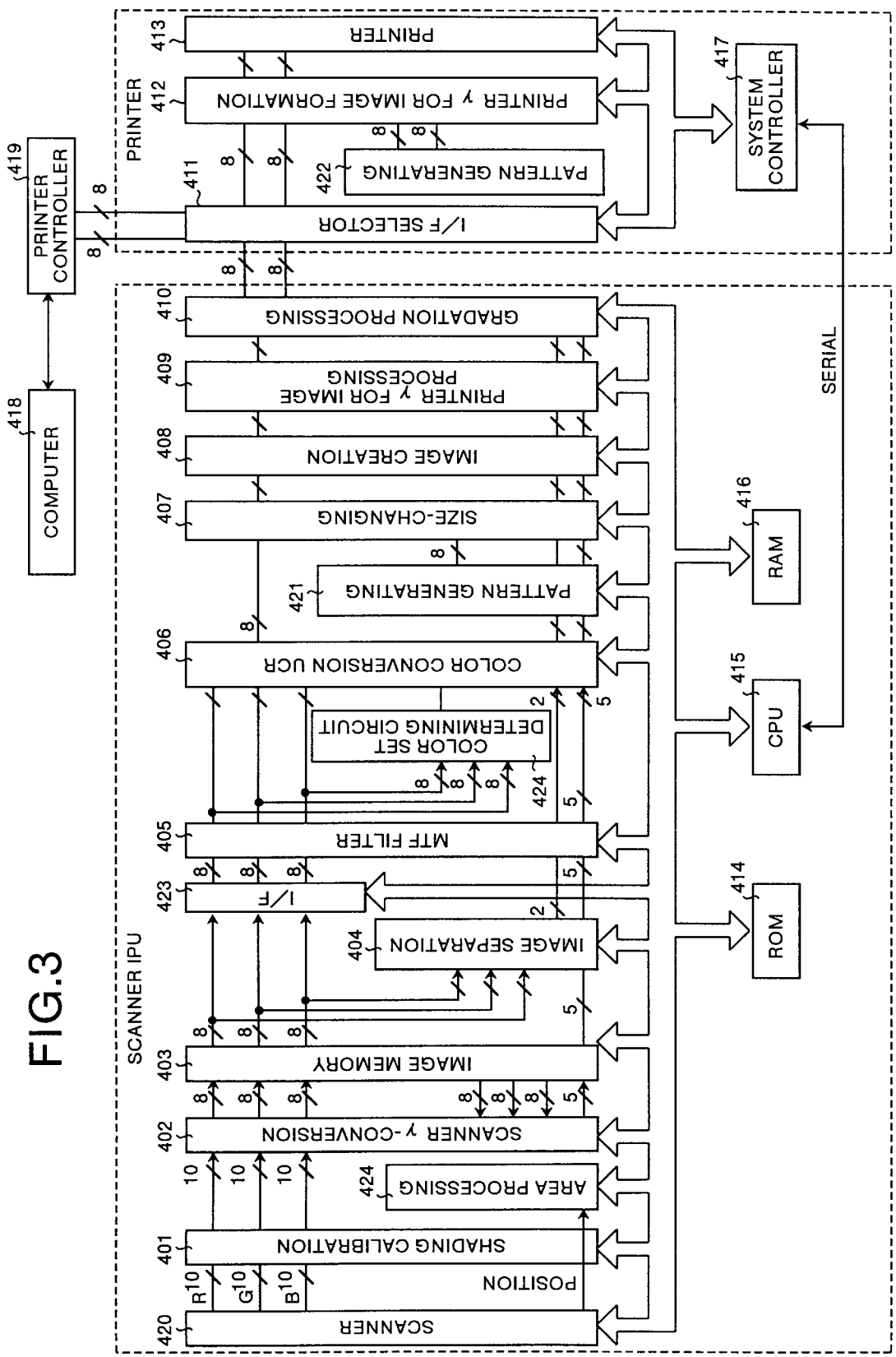
FIG. 3 is a block diagram showing configuration of an image processing section.

Next description is made for the image processing section with reference to the block diagram in FIG. 3.

In FIG. 1, designated at the reference numeral 420 is a scanner, at 401 a shading calibration circuit, at 402 a scanner γ conversion circuit, at 403 an area processing circuit, at 404 an image separating circuit, at 405 an MTF filter, at 406 a color conversion UCR processing circuit, at 407 a size-changing circuit, at 408 an image create circuit, at a printer γ calibration circuit for image processing; at 410 a gradation processing circuit, at 411 and 423 each an interface I/F selector, at 412 a printer γ (described as procon γ) conversion circuit for image formation, at 413 a printer, and at 421 and 422 each a pattern generating circuit.

A document to be copied is subjected to color separation to R, G, and B by a color scanner 420, and is read as a 10-bit signal. The read image signal is subjected to calibration of non-uniformity in the main scanning direction by the shading calibration circuit 401 and is outputted as a 10-bit signal.

In the scanner γ conversion circuit 402, a read signal from the scanner is converted from reflection factor data to brightness data. In the image separating circuit 404, determination for discriminating a character section from a picture section and also determination for discriminating chromatic colors from achromatic colors are executed. In the MTF filter 405, processing for changing frequency characteristics of an image signal such as emphasis of an edge or smoothing to obtain a sharp image or a soft image according to a user's desire is executed.

In the area processing 403, an area signal is generated to indicate to which area of a document the image data currently being processed belongs. Parameters used in an image processing section in the downstream section is switched according to the area signal generated in this circuit. Image processing parameters such as a color calibration coefficient, a space filter, and a gradation conversion table most suited to each of various types of document such as characters, glossy photo (photo-sensitive paper), a printed document, a document printed with an ink-jet printer, a document written with a fluorescent pen, a map, or a thermally transferred document can be set for each specified area.

The interface (I/F) 423 is used when outputting an image read with the scanner 420 to the outside. When used as a printer section (an image forming section) and a scanner/IPU section (image reading/image processing section) like in a copying machine, it is possible to take out the read image from the I/F selector 411 of the printer section to an external device.

The color conversion UCR processing circuit 409 comprises a color calibration processing section for calibrating the difference between color separation characteristics of a color material in the input system and spectral characteristic of that in the output system and computing a volume of color materials YMC required for reproduction of faithful colors and a UCR processing section for replacing a section where three colors of Y, M, and C are superimposed with a BK (black) section. The color calibration processing can be realized by executing the matrix computing as shown in FIG. 30.

Herein *R, *G, and *B indicate complements for R, G, and B respectively. The matrix coefficient aij is decided according to the spectral characteristic of color materials in the input system as well as those in the output system. Herein the primary masking equation is described as an example thereof, but it is possible to execute color calibration with higher precision by way of using a quadratic term such as $*B^2$ or $*(BG)$, or a higher-dimensional term.

Also the equation for computing may be changed according to a color phase, or the Neugebauwer equation may be employed. In any way, required volumes of color materials Y, M, and C can be obtained from values of *B, *G, and *R (or may be obtained from the values of B, G, and R). In the color phase determining circuit 422, determination is made as to which of R, G, B, C, M, and Y the RGG signal is for, and a color conversion coefficient corresponding to the determined color phase is selected.

On the other hand, the UCR processing can be executed by computing through the following equations:

$$Y'=Y-\alpha \cdot min\ (Y, M, C)$$
$$M'=M-\alpha \cdot min\ (Y, M, C)$$
$$C'=C-\alpha \cdot min\ (Y, M, C)$$
$$Bk=\alpha \cdot min\ (Y, M, C) \qquad (1)$$

In these equations, α is a coefficient for deciding a rate of UCR, and when α=1, 100% UCR processing is executed. The numeral α may be a constant value. For instance, an image in a hi-lighted section can be made smooth by setting α in a high density section to a value close to 1 and that in the hi-lighted section to a value close to 0.

In the size-change processing circuit 407, size change in the horizontal direction as well as in the vertical direction is made, and the image create circuit 408 executes such operations as repeat processing.

In the printer γ calibration circuit 409 for image processing, calibration of an image signal is executed according to an image quality mode such as a character, or a picture. Also such processing as deletion of the background can be executed simultaneously. The printer γ calibration circuit 409 for image processing has a plurality (for instance, 10) of gradation conversion tables switchable according to an area signal generated by the area processing circuit 403 described above. Any optimal gradation conversion table suited to each type of document can be selected from among the plurality of gradation tables according to a plurality of image processing parameters such as a character, glossy photo (sensitized paper), a printed document, a document printed with an ink-jet printer, a document written with a fluorescent pen, a map, or a thermally transferred document.

In the gradation processing circuit 410, the dither processing is executed. As for output from this gradation processing circuit 410, the image data bus has a 16-bit width (2 sets of 8-bit image data) for lowering the pixel frequency to ½ of the original one so that the two sets of image data can be transmitted to the printer 413 simultaneously.

The interface I/F selector 411 has a switching function for outputting image data read with the scanner 401 for processing by an external image processor or the like or for outputting image data from an external host computer or an image processor to the printer 413.

The printer γ (procon γ) conversion circuit 412 for image formation converts an image signal from the interface I/F selector 411 by referring to the gradation conversion table and outputs the converted image signal to the laser modulation circuit.

The printer section comprises the interface I/F selector 411, printer γ conversion circuit 412 for image formation, printer 413, and system controller 417, and can be used independently from a scanner or an IPU. An image signal from the host computer 418 is inputted via the printer controller 419 into the interface 411, and the inputted image signal is subjected to gradation conversion by the printer γ conversion circuit 412 for image formation with the image formed by the printer 413, thus the printer 413 being used as a printer.

The image processing circuit described above is controlled by the CPU 415. The ROM 14 and RAM 416, are connected to this CPU 415 via bus. Also the CPU 415 is connected via a serial interface to the system controller 417, and commands from an operating section now shown herein or from other related sections are transmitted through the system controller 417. Various types of parameter are set in each of the image processing circuits described above according to the transmitted information concerning an image quality mode or image density as well as to the area information.

The pattern generating circuits 421, 422 generates gradation patterns used in the image processing section and in the image forming section respectively.

Figure 4:
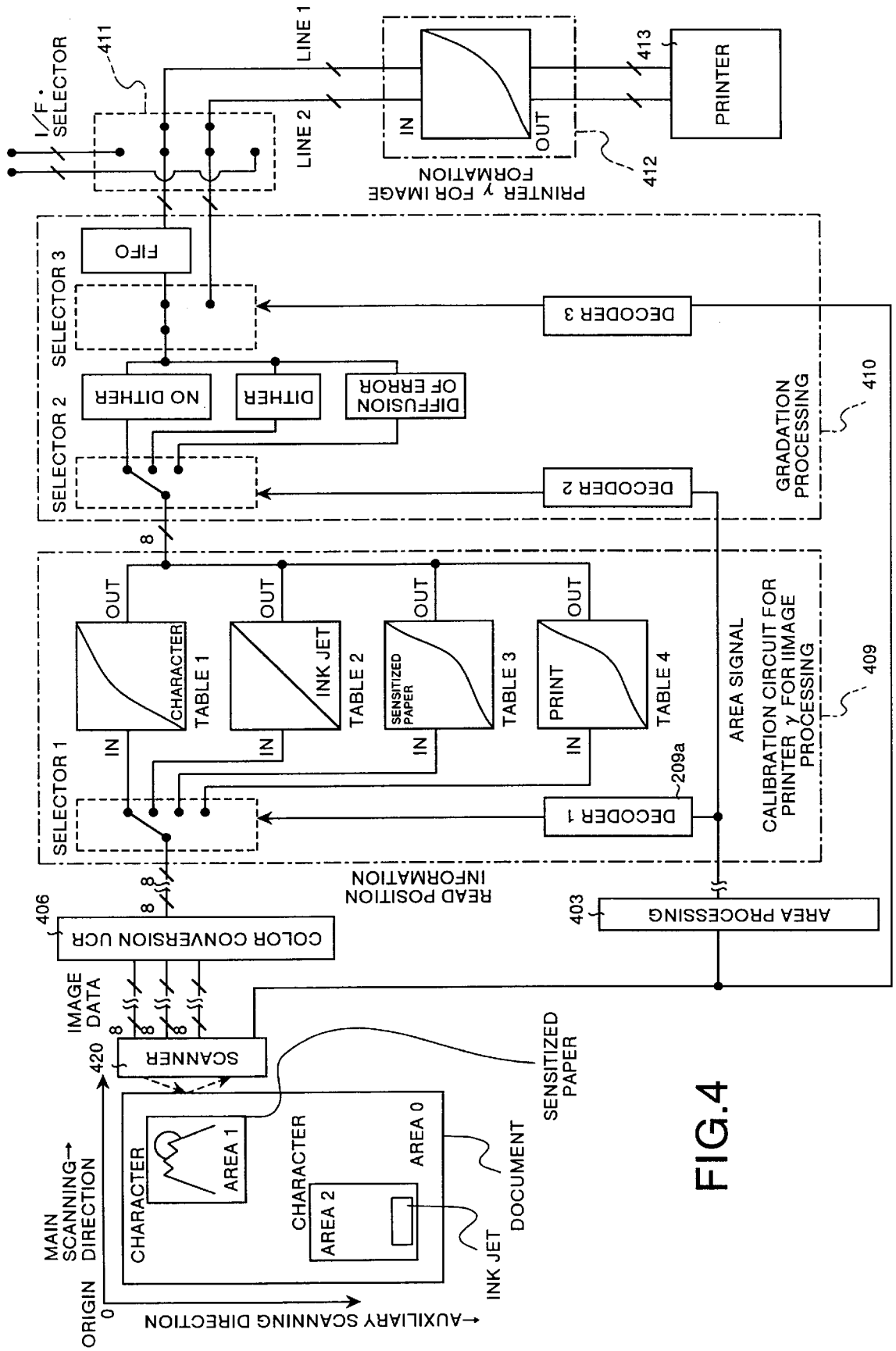
FIG. 4 is a block diagram showing configuration of a printer γ calibration circuit for image processing as well as of a gradation processing circuit.

In FIG. 4, area information specified on the document is compared to information concerning a read position when reading the image, and an area signal is generated from the area processing circuit 403. Parameters used in the scanner y conversion circuit 403, MTF filter circuit 405, color conversion UCR circuit 406, image processing circuit 408, printer γ calibration circuit for image create 409, and gradation processing circuit 410 are changed according to the area signal. In FIG. 4, especially the printer γ calibration circuit 409 for image processing and gradation processing circuit 410 are shown.

In the printer γ calibration circuit 409 for image processing, an area signal from the area processing circuit 403 is decoded by the decoder 1, and one image quality mode is selected from a plurality of gradation conversion tables for a character, a document printed with an ink-jet printer, or the like. The example of document shown in FIG. 4 shows a case where an area 0 of characters, area 1 of a picture, and area 2 of a document printed with an ink-jet printer exist therein. For instance, the gradation conversion table 1 for characters is selected to the area 0 of characters, gradation conversion table 3 for a picture to area 1 of a picture, and gradation conversion table 2 for a document printed with an ink-jet printer to area 2 of a document printed with an ink-jet printer respectively.

The image signal subjected to gradation conversion in the printer γ calibration circuit 409 for image processing is again decoded by the decoder 2 and correlated to an area signal in the gradation processing circuit 410, and the selector 2 switches gradation processing to be executed. The gradation processing which can be selected in this state includes processing not using the dither, dither processing, error-diffusion processing or the like. The error-diffusion processing is executed to a document printed with a ink-jet printer.

The image signal having been subjected to gradation processing is again decoded by the decoder 3, and selects the line 1 or line 2 according to the read positional information. Line 1 and line 2 are switched for each one pixel in the auxiliary scanning direction. Data for line 1 is temporally stored in a FIFO (First-In First-Out) memory located in the downstream side from the selector 3, and data for line 1 and those for line 2 are outputted. With this feature, it is possible to reduce the pixel frequency to ½ of the original value for inputting into the interface I/F selector 411.

Figure 5:
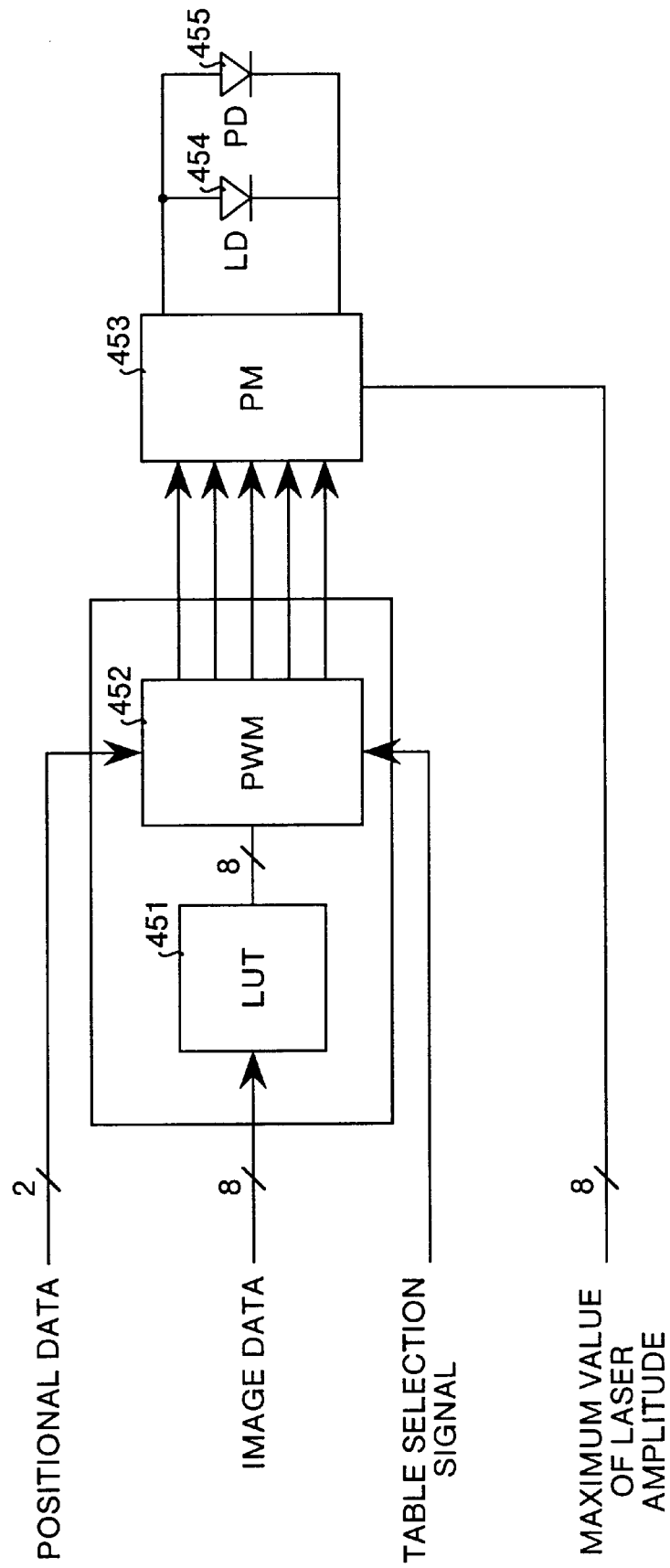
FIG. 5 is a block diagram showing configuration of a laser modulating circuit.

FIG. 5 is a block diagram showing a laser modulation circuit.

The write frequency is 18.6 [MHz], and a scanning time for one pixel is 53.8 [nsec]. The 8-bit image data can be subjected to γ conversion by way of referring to the lookup table (LUT) 451. Conversion to an 8-valued pulse width is executed according to upper 3 bits of an 8-bit image signal in a pulse width modulation circuit (PWM) 452, while power modulation to a 32-valued pulse width is executed according to lower 5 bits of the 8-bit image signal above in the power modulation circuit (PM) 453, and a laser diode (LD) 454 emits light according to the modulated signal. Brightness of the emitted light is monitored by a photo-detector (PD) 455, and calibration is executed for each one dot.

The maximum value of amplitude of laser beam can be changed by 8 bits (in 256 steps). A beam diameter in the main scanning direction (defined as a width when amplitude of the laser beam in the static mode is attenuated to $1/e^2$ against the maximum value) is less than 90% of size of one pixel, and preferably 80%. The beam diameter is 50 $\mu$m in the main scanning direction and 60 $\mu$m in the auxiliary scanning direction under the conditions of 600 DPI, 42.3 $\mu$m (one pixel)

Figure 6:
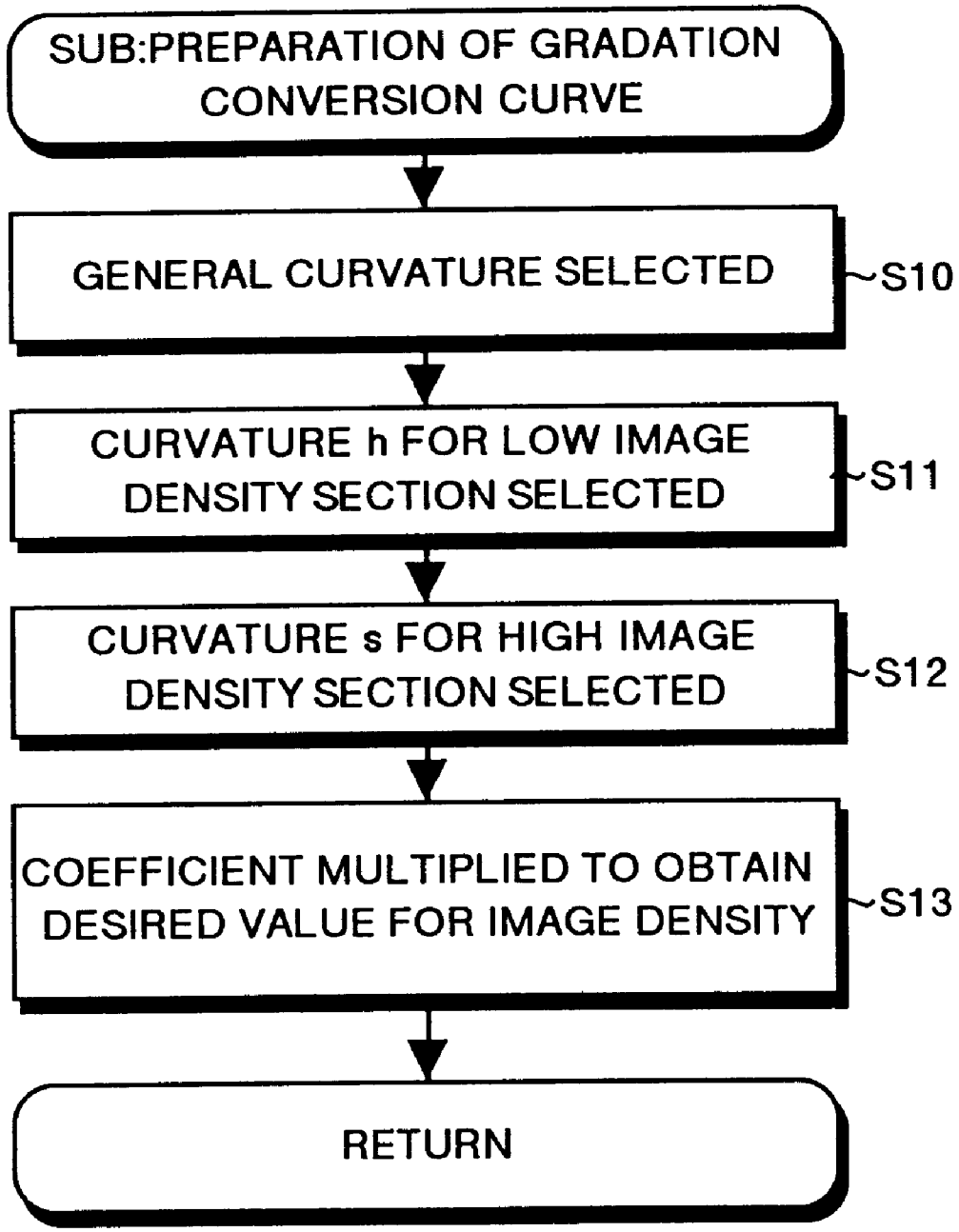
FIG. 6 is a flow chart showing a sequence for preparing a gradation conversion curve.

Next description is made for preparation of the gradation conversion table (LUT) 451 executed in the printer A calibration circuit 409 for image processing with reference to the flow chart in FIG. 6.

When preparing a gradation conversion curve, at first a general curvature is selected (step 10), and then a curvature h in the low image density (hi-lighted) section is selected (step 11). Then a curvature S in the high image density (shadowed) section is selected (step 12), and the curvatures is multiplied by a coefficient IDMAX to obtain a desired image density value (step 13).

Figure 7:
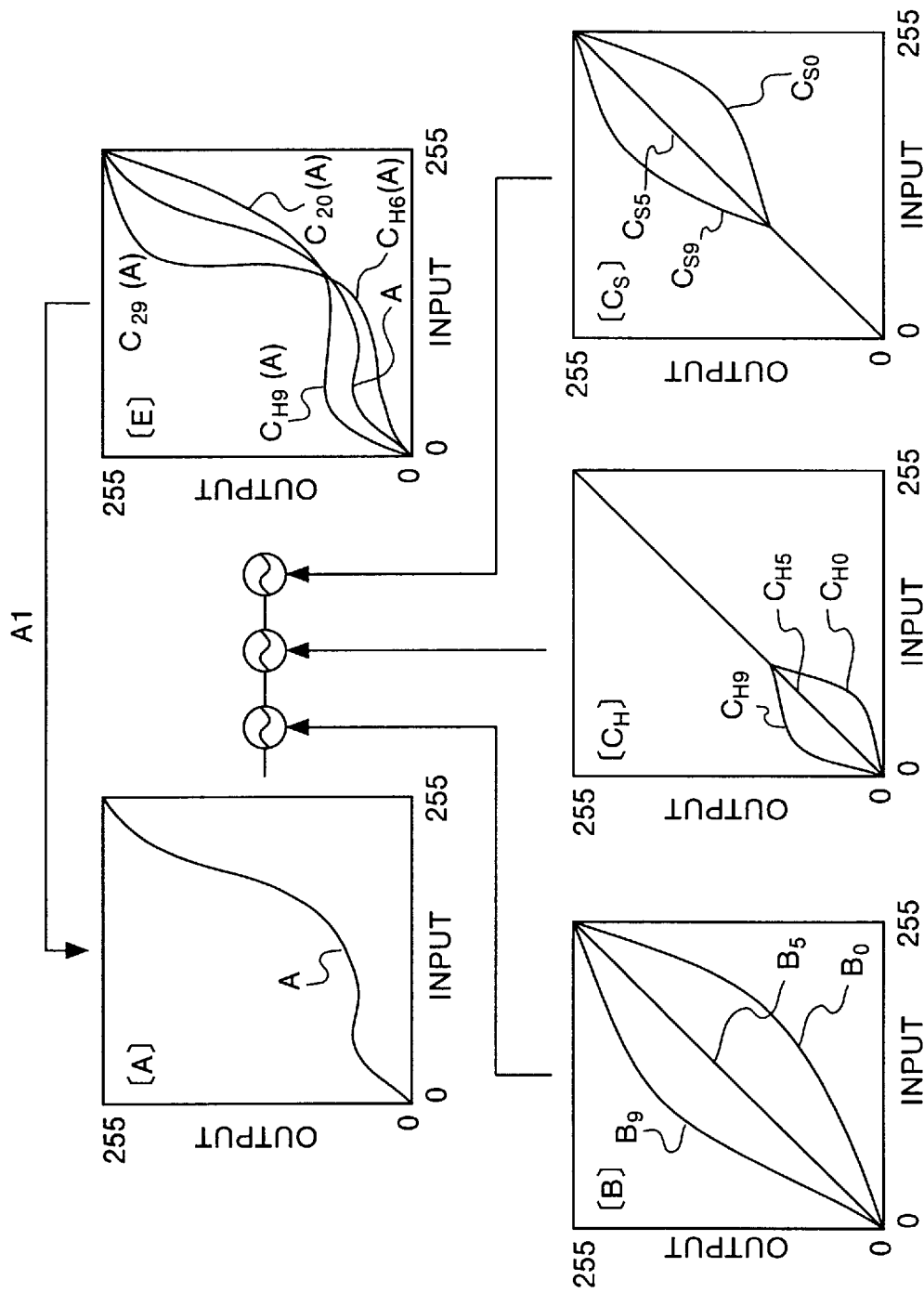
FIG. 7 is a view for illustrating preparation of a gradation conversion curve.
Figure 8:
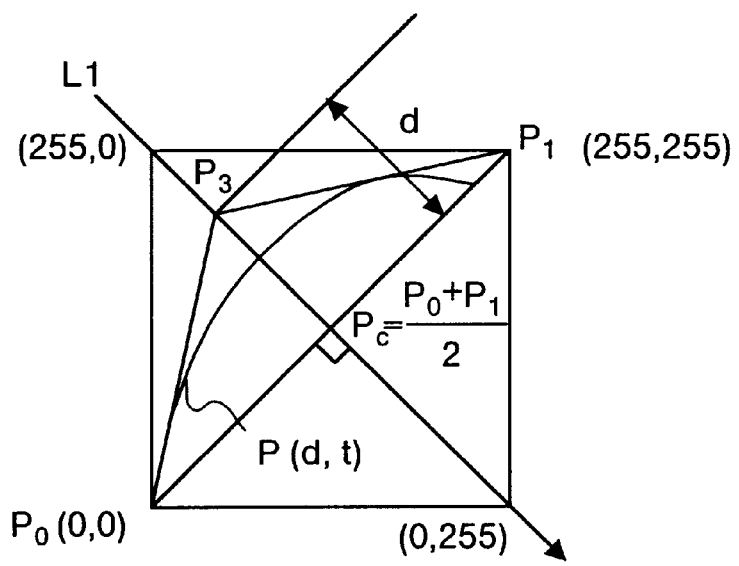
FIG. 8 is a view showing change of a curvature with Bedge function.

Next description is made for processing in this step 10 with reference to FIG. 7.

Herein it is assumed that the reference gradation curve is A, gradation conversion for changing the general curvature is B, gradation conversion for changing a curvature in the hi-lighted area (in a low density area) is CH, and gradation conversion for changing a curvature in a shadowed area (a high density area) is CS.

A gradation curve obtained by subjecting the gradation curve A to gradation conversion B is herein assumed as E, and E is expressed as B (A) (E=B(A)).

More specifically, the above computing scheme can be expressed with the program language C as follows.

```
<List 1>
typedef int Table [256];
table        A, E;
int      B (int A, int curvature)
{
        int value;
        /*computing for changing a curvature according to
        size thereof*/
        ...
        return value;
}
/*full (): processing for changing the general curvature,*/
Table       full (int curvature)
{
        /*curvature indicating a degree of curve */
        int      i;
        for (i = 0; i < = 255; i + +)
           E [i] = B (A [i], curvature);
        return E;
}
```

Herein, B indicates a function for changing a curvature of A. For instance, it is possible to use a quadratic Bedge function satisfying the conditions of 0=B (0, n) and 255=B (255, n) (n: arbitrary integral number) for an 8-bit image signal.

The Bedge function satisfying the above conditions is expressed as a quadratic Bedge curve from a line L crossing a straight line P0P connecting a start point P0 (0, 0) to an end point 1 (255, 255) as well as a straight line P0P1 and a control point P2 existing on the line L as a function of a distance d from a cross point between the straight line P0P1 and straight line L as a parameter.

With the function above, a curvature can be changed by changing the distance d in proportion to an integral curvature as an argument for the function B. Next description is made for a case of a straight line L1 crossing the straight line P0P1 as well as for a case of a straight line L2 parallel to the vertical axis in the figure.

Using a distance d from the control point in the first example to a middle point PC=(P0+P1)/2=(127.5, 127.5) or (127, 127) or (128, 128) of a string formed by both edge points thereof, P0, and P1 as a parameter, the control point P2 is given by the following equation:

$$P2(d)=PC+(-d/\sqrt{2}, d/\sqrt{2})=(127.5-d/\sqrt{2}, 127.5+d/\sqrt{2}) \quad (2)$$

So the gradation conversion curve P (d, t) is given by the following equation:

$$P(d, t)=P0 \cdot t^2+2 \cdot P2(d) \cdot t \cdot (1-t)+P1 \cdot (1-t)^2 \quad (3)$$

Herein t is a parameter in a range from 0 to 1 ($0 \leq t \leq 1$). As P (d, t) is given as a combination of input x to the gradation conversion curve and output y therefrom (x, y), assuming that x is equal to A (x=A) as the integral number A given as an argument for the function B ( ), t is computed from the equation (1), and the output value y is obtained by substituting the obtained t again into the equation (3).

Actually, in place of executing each time the computing as described above, at first computing is made for all combinations of (x, y) ($0 \leq x \leq 255$), the obtained values are arranged as a table and stored in a ROM, thus time for computing being saved. Several (or several tens of) sets of this gradation calibration table each having a different curvature respectively are stored in a ROM. The curvature is given as an argument for the function B ( ) described above.

With this operation, <list 1> is rewritten as follows.

```
<List 2>
const           table_max = 9;
typedef int     Table [256];
Table           A, E, B [table_max];
/*full (): Processing for changing the general curvature, */
    Table   full (int curvature)
{
        /*curvature specifies a degree of curve. */
        int     i:
        for (i = 0; i < = 255; 1 + +)
        E [i] = B [curvature] [A [i]];
        return E ;
}
main ()
{
        /* curvature indicates a degree of curve */
        int     curvature = 1;
        E = full (curvature);
}
```

In the example described above, table _max is equal to 9 (table_max=9), so that the number of tables each having a different curvature is 9.

It should be noted that, although the Bedge curve is used in the above example, a higher-dimensional function, an exponent, or logarithm may be used according to the necessity.

Next description is made for processing in step 11 and step 12.

Like in the case described above, it is possible to differentiate a curvature in a low image density (hi-lighted) area from that in a high image density (shadowed) area.

<List 2> can be rewritten to the following more general form:

```
<List 3>
const           table_max = 9;
typedefint      Table [256];
Table A, E, B [table_max],
/*Transform (): Processing for changing a curvature, */
Table Transform (Table Transformer, Table Original)
{
/*  This function executes processing for changing     *
 *  a curvature of a gradation conversion curve called  *
 *  original using a gradation conversion curve         *
 *  called Transformer
        int i;
        for (i = o; i < = 255; 1 + +)
        E [i] + Transformer      [Original [i]];
        return E;
}
main ()
{
        /* curvature indicates a degree of a curve */
        int      curvature = 1;
        E = Transform (B [Curvature], A);
/*      Curvature of the gradation conversion curve A is  *
 *      changed using the gradation conversion            *
 *      curve B [curvature] */
}
```

<List 2> can be rewritten as follows by executing conversion of the hi-light conversion curve CH [h] to the shadow conversion curve CS [s].

```
<List 4>
const           table_max = 9;
typedef         int Table [256];
Table           A, B [table_max], E, CH [table_max], CS [ table_max];
/*Transform (): Processing for changing a curvature    */
Table Transform (table Transformer, Table Original);
main ()
{
        int    curvature, h, s;
/*      Curvature of a curve is changed by way of
        changing numerical values of curvature, h, s */
        /* The general curvature is changed */
        E = transform (B [curvature], A);
        /*Curvature in a low image density (hi-light) section
        is changed */
        E = Transform (CH [h], E);
        /*Curvature in a high image density (shadowed) section
        is changed */
        E = Transform (CS [s], E);
}
```

Herein, curvature, h, and s are values for deciding a general curvature and those in the hi-lighted section and in the shadowed section. It should be noted that curve in the hi-lighted section is decided independently from that in the shadowed section.

A gradation conversion curve for changing a curvature in a particular density area such as the hi-lighted area or shadowed area is prepared as described below.

The gradation conversion curve is generated by using a tertiary Bedge curve from the straight line P0P1 connecting the start point P0 to the end point P1, straight line L crossing the straight line P0P1, and the control point P2 existing on the straight line L as a function including the distance d from a crossing point between the straight line P0P1 and straight line L as a parameter.

Herein description is made for the line L1 crossing the straight line P0P1 at right angles as well as for the straight line L2 parallel to the vertical axis in the figure.

Figure 9:
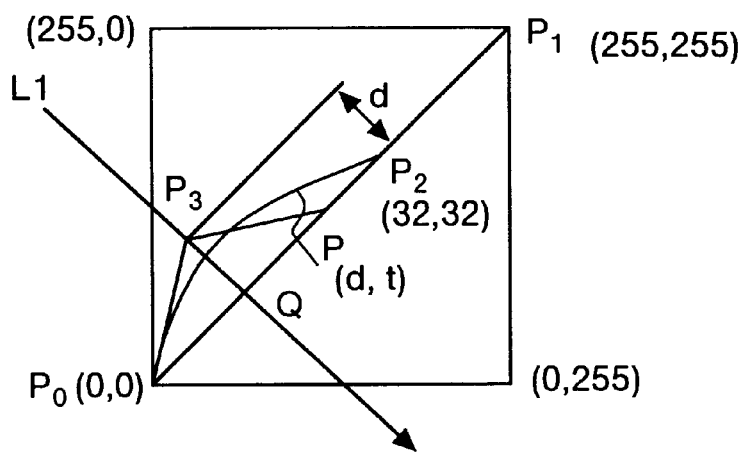
FIG. 9 is a view showing a conversion curve for changing gradation characteristics of a hi-lighted area.

A conversion curve for changing gradation characteristics in a hi-lighted area is prepared, for instance, as shown in FIG. 9. Herein it is assumed that coordinate values of the start point P0 and end point P1 are (0, 0) and (255, 255) respectively, and also that those of the first control point P2 are (32, 32).

Also it is assumed herein that a control point P3 in the first example is defined by the expression of P3 (d)=(16, 16)+ (-d/√2, d√2), d being a distance from a cross point between the straight line P0P1 and the straight line L1 as a parameter.

Further it is assumed herein that the control point P3 in the second example is expressed by the expression of P3 (d)= (16, 16)+(0, d), d being a distance from a cross point between the straight line P0P1 and straight line L2. Using the control points P0 to P3 above, the gradation conversion curve P (d, t) is given by the following equation:

$$P(d, t) = P0 \cdot t^3 + 3 \cdot P2 t^2 + (1-t) + 3 \cdot P3(d) \cdot (1-t)^2 + P1 \cdot (1-t)^3 \quad (4)$$

Although it is assumed in the description above that the end point P1 is (255, 255), herein it is assumed that the end point P1 is a point on a string m: (0, 0)–(255, 255), thus the point P1 being, for instance, (64, 64). In this case, a portion not included in the string P0P1 on the string m is treated as identical in gradation conversion, and other portions effect as a gradation conversion curve for changing a curvature in a particular density area such as a hi-lighted area or a shadowed area.

Next, description is made for a method of preparing a gradation conversion table set in the printer y conversion circuit 412 for image formation.

Figure 10:
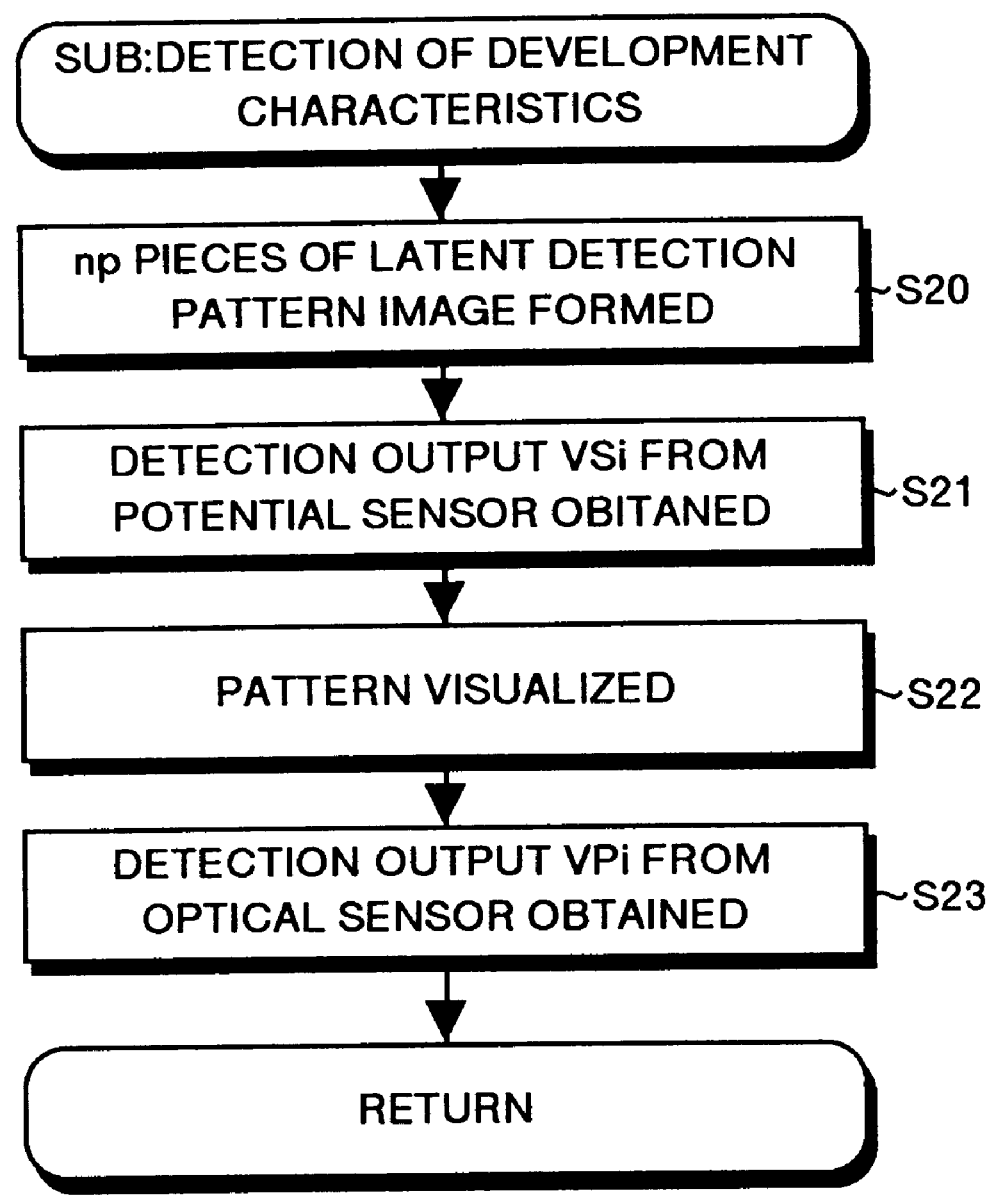
FIG. 10 is a flow chart showing a sequence in a method of detecting development characteristics.
Figure 11:
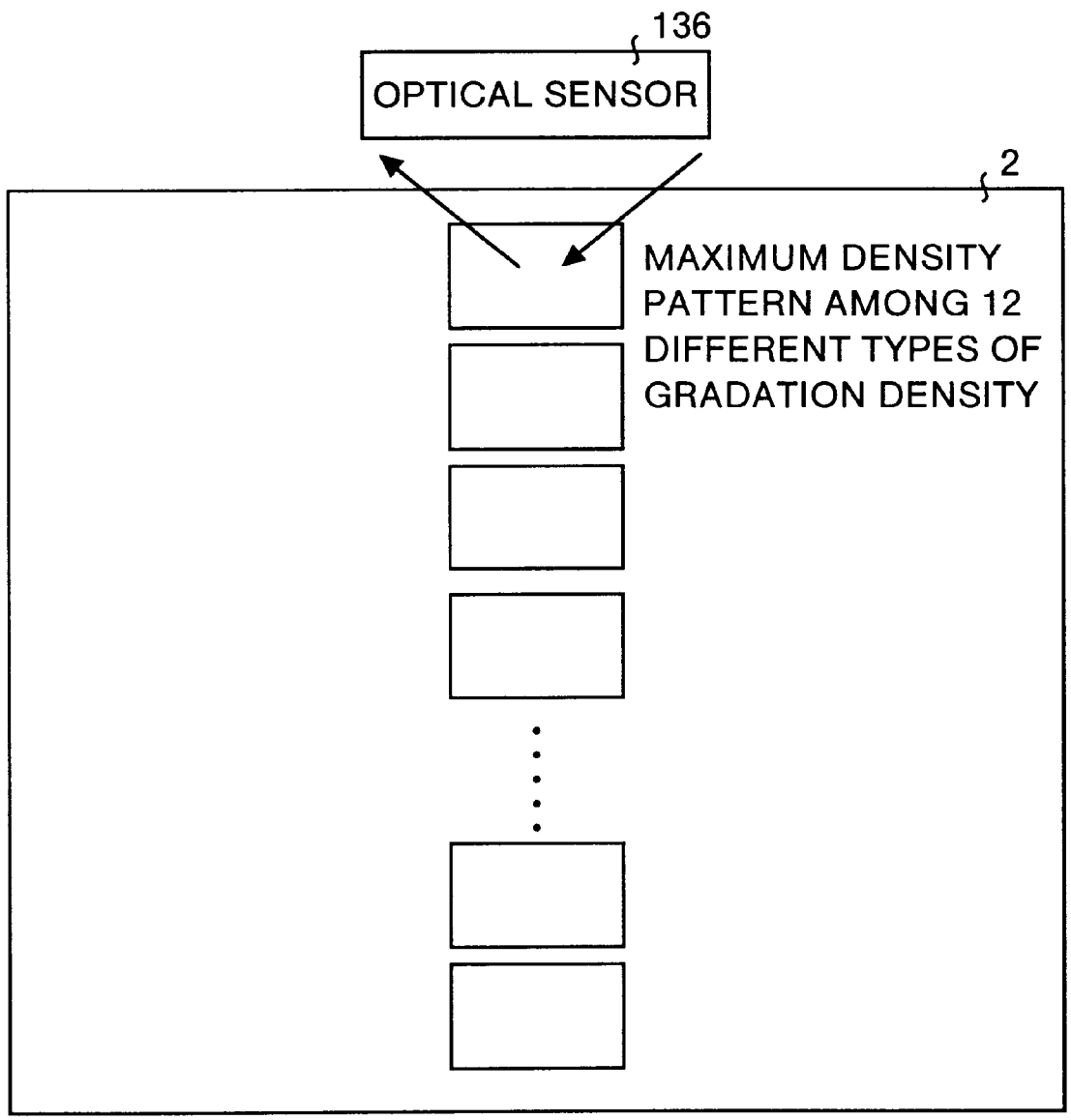
FIG. 11 is a view showing formation of 12 types of gradation pattern each having a different gradation density respectively.

At first, description is made for a method of detecting the development characteristics with reference to the flow chart in FIG. 10. As shown in FIG. 11, np pieces (herein np=12) of density gradation patterns are formed on the light-sensing drum 102 (step 20). Then a surface potential VS1 (i=1, 2, ..., np) of the light-sensing drums are read with a surface potential sensor 139 (step 21), and toner is deposited thereon by a developing unit for development and visualization (step 22). Then detection output VPi (i=1, 2, ..., np) for a toner image on the light-sensing drum 102 is obtained by an optical sensor 136 existing in the downstream side in the rotating direction of the light-sensing drum 102 (step 23).

For laser output used in detection, for instance, the following values of image signals (each in the hexadecimal form) are used: 00 (H), 10 (H), 20 (H), 30 (H), 40 (H), 50 (H), 60 (H), 70 (H), 90 (H), B0 (H), D0 (H), FF (H)

A sum of image signals for every two pixels in the main scanning direction is allocated to each of the two pixels according to the value as described below. Namely, assuming that an image signal for the first pixel is N1 and that for the second pixel is N2, and also that an image signal for the first pixel after processing is N1* and that for the second pixel is N2*, N1*=N1+N2, N2*=0, when N1+N2<=FF (H), and N1*=FF (H), N2*=N1+N2-FF (H), when N1+N2>FF (H)

Figure 12:
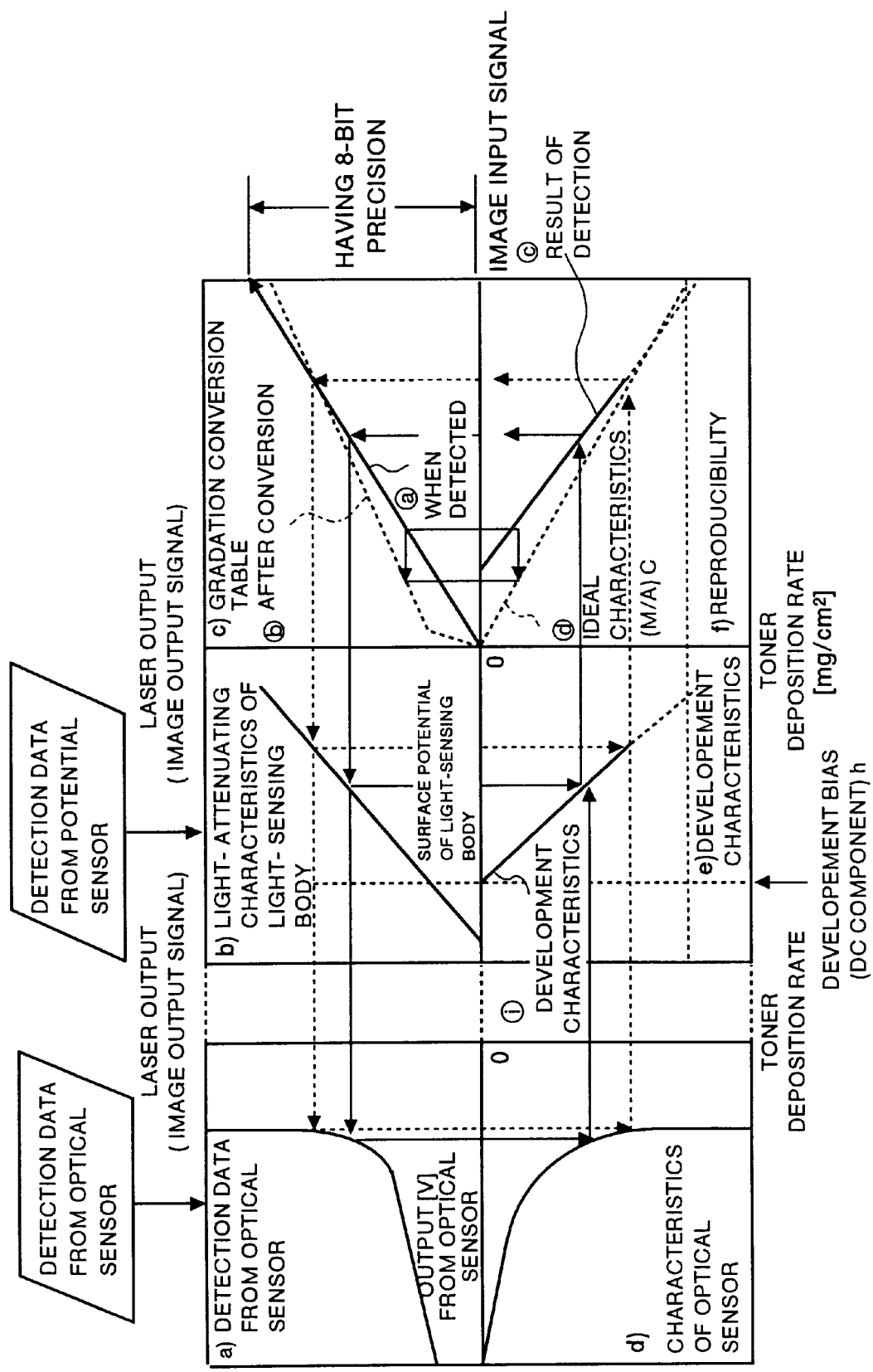
FIG. 12 is a view for illustrating a method of calibrating an image signal.

Next description is made for a method of correcting an image signal with reference to FIG. 12.

The vertical axis in the graph a) indicates laser output (or an image output signal), while the horizontal axis indicates output from the optical sensor 136. This graph is obtained by forming np pieces of latent images for density gradation patterns on the light-sensing drum 102, developing the latent images, and detecting a volume of reflected light from the toner image.

The vertical axis in the graph b) indicates laser output like in the graph a), while the horizontal axis indicates a surface potential of the light-sensing drum. This indicates the light attenuation characteristics of the light-sensing drum 102. Like in graph a), the surface potential is obtained by measuring with the potential sensor a surface potential when np pieces of latent image for density gradation pattern are formed on the light-sensing drum 102.

The graph c) shows a gradation conversion table used in an image forming section, and the horizontal axis in the figure indicates an image input signal (a rate proportional, for instance, to density of a document image), while the vertical axis indicates an image signal (image output signal) after laser output or an image input signal is converted by referring to a gradation conversion table. Herein the image input signal has a resolution of 8 bits (256 values), and also there is provided an 8 (to 10)-bit resolution between a minimum value and a maximum value of laser output.

In the figure, a indicates a relation between laser output used for detection and an image input signal. The vertical axis in the graph d) indicates a toner deposition rate on the light-sensing drum 102, while the horizontal axis indicates output from the optical sensor 136, which indicates output characteristics of the optical sensor 136. This characteristics varies according to a type or a attachment angle of a sensor used or a distance from the light-sensing drum 102, but these parameters are previously known and substantially constant.

The vertical axis in the graph e) indicates a toner deposition rate, while the horizontal axis indicates a surface potential of the light-sensing drum 102. This graph shows a relation between a surface potential on the light-sensing drum 102 and a toner deposition rate 102 thereon (namely the development characteristics).

In the figure, h indicates a DC component of the development bias.

The graph f) shows a relation between an image input signal and a toner deposition rate on the light-sensing drum 102.

Output VPi from the optical sensor 136 is converted to a toner deposition rate (M/A) i [mg/cm$^2$] (i=1, 2, ..., np) on the light-sensing drum 102 using the relation shown by the graph d).

This conversion is executed, for instance, in the following way.

A reflected light from a toner image 304 formed on the light-sensing drum 102 is detected by an optical sensor 136, and is sent as a detection signal to the main control section 130. Assuming herein that VSP and VSG are output from the optical sensor 136 for a reflected light from the toner-deposited section in the reference pattern section and output from the optical sensor 136 for a reflected light from the background section therein respectively, a deposition rate of toner deposition on the reference pattern per unit are m1 [g/cm$^2$] is expressed by the following equation:

$$m1 = -1n(V_{SP}/V_{SG})/\beta$$

$$\beta = 6.0 \times 103 \, [cm^2/g] \quad (5)$$

Herein β is a constant decided by the optical sensor 136 and toner, and the value shown above is a value for black toner. The conversion can be made similarly also for yellow, cyan, and magenta. Description was made above assuming a case where computing is executed, but conversion may be made by referring to a look-up table previously prepared.

With the method described above, a relation between a surface potential VSi of the light-sensing drum 102 and a toner deposition rate on the light-sensing drum 102 (M/A)i is fixed, and the development characteristics i on the graph e) is obtained.

However, as shown by the graph d), output from the optical sensor 136 shows a constant value $VP_{MIN}$ when the toner deposition rate is higher than a certain toner deposition rate (M/A) C ((M/A)≧(M/A)C). On the other hand, for an image signal higher than the image input signal n at c) in FIG. 12, in spite that actually a surface potential of the light-sensing drum 102 goes down and a toner deposition rate changes as shown in b), a toner deposition rate (M/A) on the light-sensing drum 102 is always kept constant at (M/A)C. For this reason, even if the actual development characteristics is C in the graph e), the development characteristics obtained from a result of detection is as indicated by i, so that displacement occurs between the actual value C and the detected value i.

Figure 13:
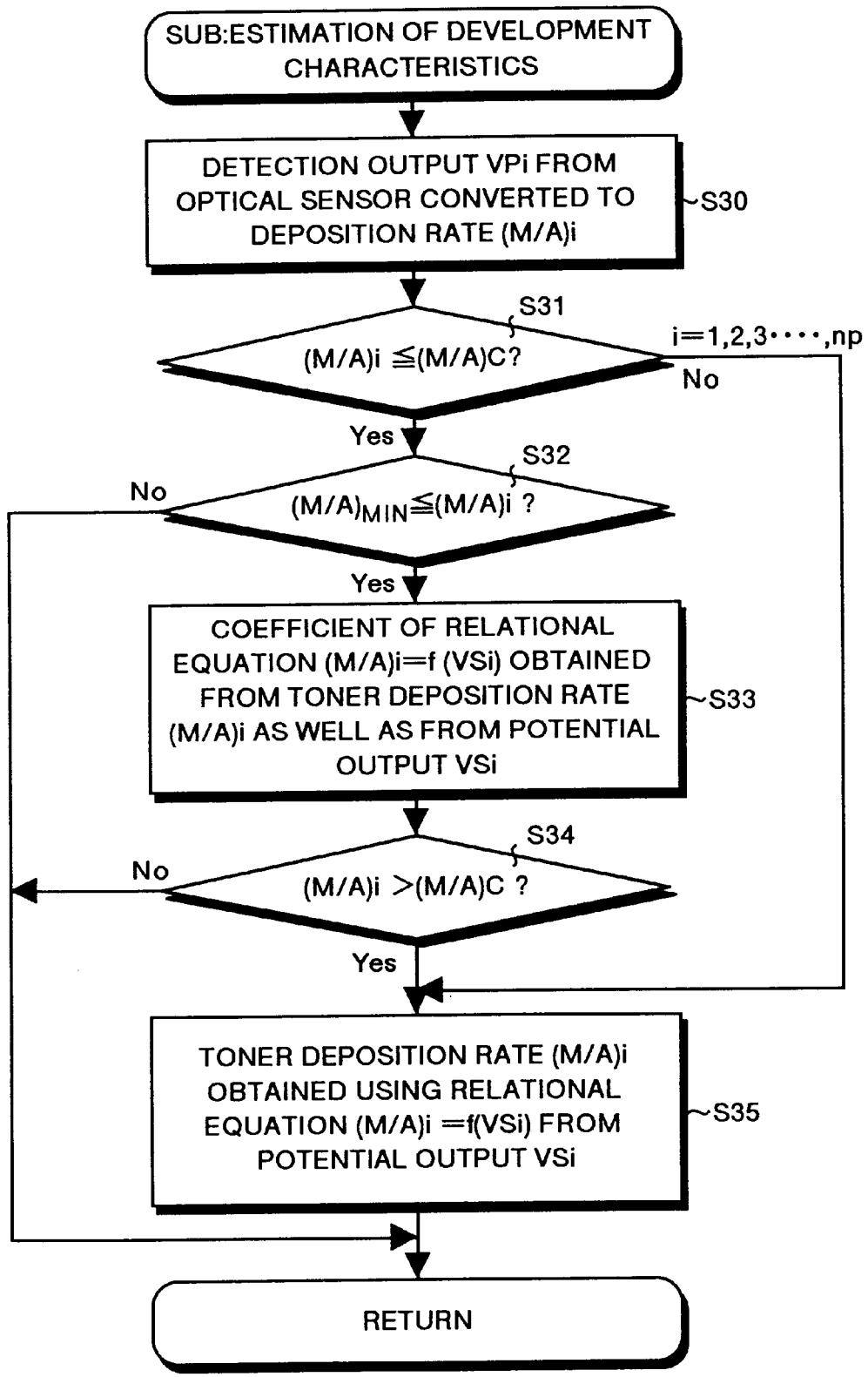
FIG. 13 is a flow chart showing a sequence in processing for calibrating displacement in development.
Figure 14:
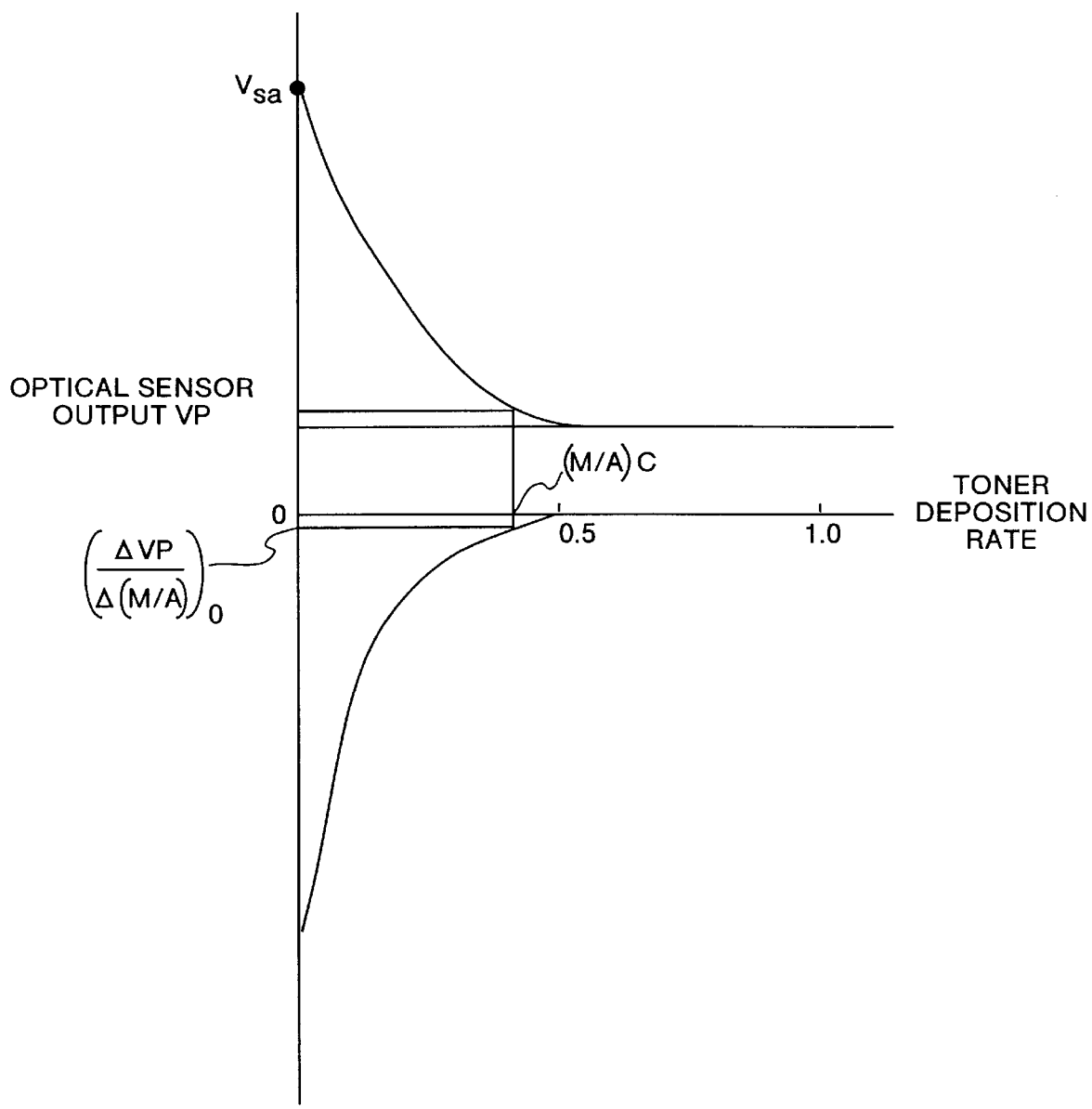
FIG. 14 is a view showing a relation between output from an optical sensor and a toner deposition rate.
Figure 15:
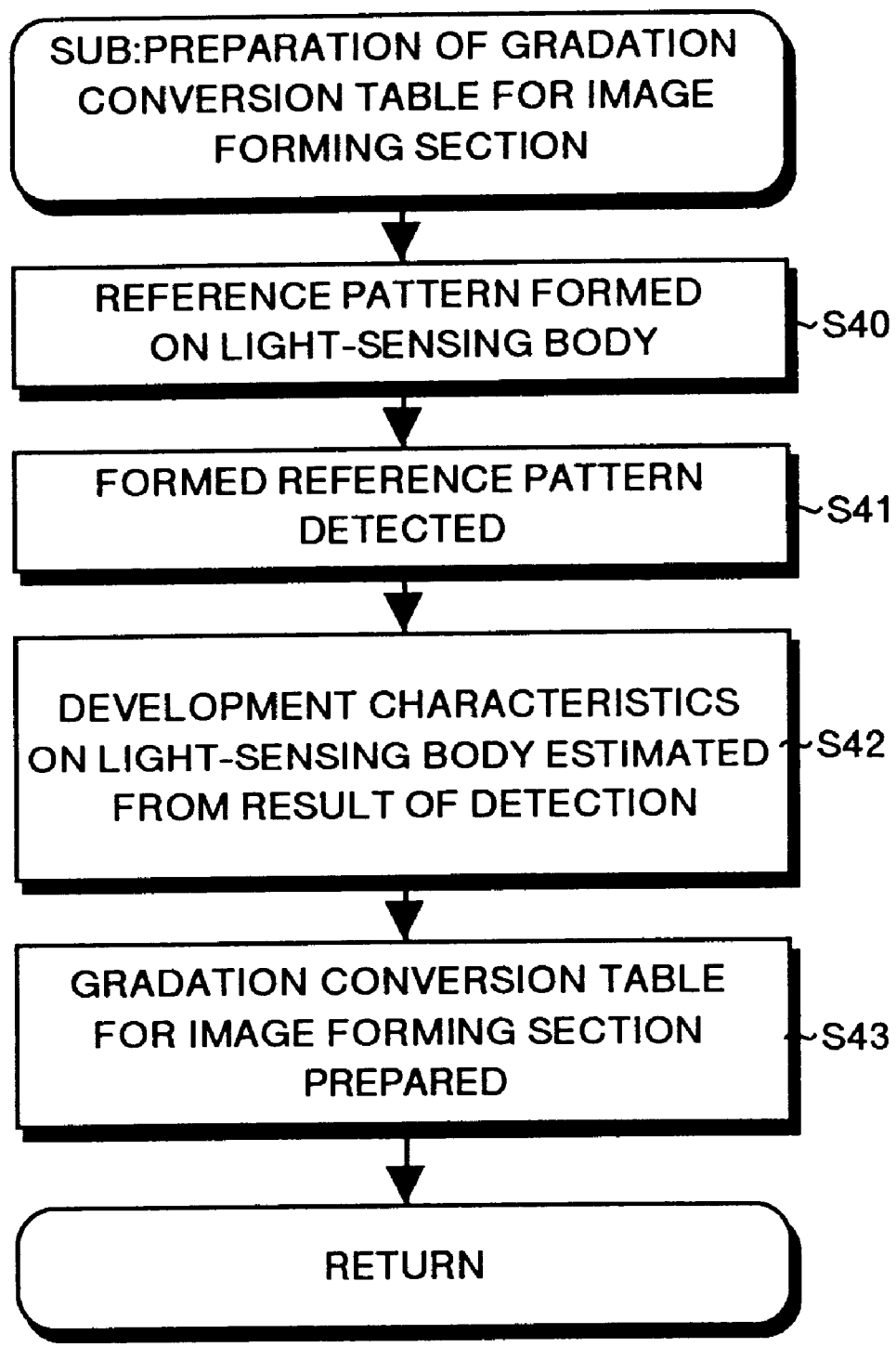
FIG. 15 is a flow chart showing a sequence in preparation of a gradation conversion table for image formation.

Next description is made for calibration of displacement between actual development characteristics and that obtained from a detected value with reference to the flow chart in FIG. 13.

At first, when a detected value VPI for am image signal i by the optical sensor 136 is higher than a specified value VPc, the detected value is converted to a toner deposition rate on the light-sensing drum 102 or a value (M/A) i substantially proportional to the toner deposition rate above (step 30). A relational value between an output value VSi from the surface potential sensor 139 and (M/A) i is obtained from these values. Herein the following relational equation is employed:

$$(M/A)\ i = a \times VSi + b\ (VPi \geq VPc) \qquad (6)$$

when a primary equation is used, or $$(M/A)\ i = a \times (VSi - VDC) + b\ (VPi \geq VPc) \qquad (7)$$

assuming a DC component of development bias as VDC. Herein a and b are coefficients and are decided from values of VSi and (M/A) i using the minimum self-squaring method. Herein, assuming that a toner deposition rate on the light-sensing drum 102 when an output value from the optical sensor 136 is VPc is (M/A) C, the same effect can be obtained in a range of deposition rate satisfying the condition of (M/A) i≦(M/A) C.

In an area where a toner deposition rate on the light-sensing drum 102 is lower than a certain value $(M/A)_{MIN}$, sometimes deviation from a linear relation between a toner deposition rate and a surface potential on the light-sensing drum 102 may become large. To prevent this phenomenon, the coefficients a and b in the equation (6) described above are decided according to a result of detection (step 31, step 32) for a toner deposition rate on the light-sensing drum 102 so that the condition of $(M/A)_{MIN} \leq (M/A) \leq (M/A)$ C is satisfied (step 33).

Although a toner deposition rate is used, the coefficients a and b in the equation (7) described above may be decided according to a toner-deposited area satisfying the condition of:

$$VPc \leq VP \leq VP_{MIN} \qquad (8)$$

assuming that $VP_{MIN}$ is detection output from the optical sensor 136 corresponding to $(M/A)_{MIN}$.

Then determination is made as to whether (M/A) i is larger than (M/A) C or not (step 34). When it is determined that (M/A) i is larger than (M/A) C (step 35: Y), a toner deposition rate (M/A) i on the light-sensing drum 102 is obtained from the potential output VSi (step 35).

Although determination as to whether a value as detection output from the optical sensor 136 is to be used or not was made in the example above by checking whether the value as detection output from the optical sensor 136 is larger than a specified value VPc or not, this VPc can be obtained among (M/A) C as a toner deposition rate on the light-sensing drum 102 when an absolute value $|\Delta VP/\Delta(M/A)|$ of a ratio of a change rate $\Delta VP$ of an output value VP from the optical detector vs a change rate $\Delta(M/A)$ in a toner deposition rate (M/A) on the light-sensing drum 102 is equal to a specified value $|\Delta VP/\Delta(M/A)|0$ and VPc as output value from the optical sensor 136 at that time, and can be used in the above method.

In this case, an area of the toner deposition rate or the light-sensing drum 102 satisfying the expression of $|\Delta VP/\Delta(M/A)| \geq |VP/|(M/A)|0$ corresponds to the relation of (M/A) ≦(M/A) C, and the expression of $|\Delta VP/\Delta(M/A)| > |\Delta VP/\Delta(M/A)|0$ corresponds to the relation of (M/A) i≦(M/A)C (Refer to FIG. 4).

The detection result as shown in the graph f) can be obtained from the development characteristics i and an image signal as described above.

The detection characteristics c in the fourth quadrant is obtained from a gradation conversion table a in the first quadrant. Using this result, it is possible to obtain the gradation conversion table b) after calibration for obtaining the ideal characteristics d. The gradation conversion table as described above is used as a gradation conversion table for image formation.

The processing sequence described above is shown in the flow chart in FIG. 15.

At first, a reference pattern is prepared on the light-sensing drum 102 (step 40), and the reference pattern formed thereon is detected by the optical sensor 136 as well as by the surface potential sensor 139 (step 41). Then from a result of detection as well as from the laser output value (image signal) used when the pattern is formed, the development characteristics is estimated (step 42), and a gradation conversion table for image formation is prepared from the estimated development characteristics (step 43).

When the gradation patterns for automatic gradation calibration is outputted, a write value for the gradation patterns n [j] (for instance, j=0, 1, 2, . . . , 16) is converted and used according to the gradation conversion table B [i] (i=0, 1, 2, . . . , 255) (in a case of 8-bit processing) formed in the processing above. The processing assuming that a write value for a gradation pattern after conversion is n1 [j] (for instance, j=0, 1, 2, . . . , 16) can be written with the programming language C as follows.

/*Convert a write value for a gradation pattern according to a gradation conversion table for image formation */
/*Start of processing */
int j;
   for (j=0; j<16; j++)
      n1[j]=B [n[j]];
/*End of processing */

This means that n [i] is converted and n1 [i] is obtained according to the gradation conversion table B [i] which is a look-up table.

Next description is made for a method of calibrating the development characteristics when it changes in a specified period of time after it is initially set.

Herein it is assumed that a indicates a relation between an image input signal initially set and laser output; b indicates data detected by the optical sensor 136 for the laser output then; c indicates a relation between a toner deposition rate on the light-sensing drum 102 and a surface potential on the light-sensing drum obtained as described above; and d indicates a relation between a toner deposition rate on the light-sensing drum 102 and an image input signal.

If detection output from the optical sensor 136 in a specified period of time is b', it indicates that the development characteristics has changed from c to c', and that, as a result of the change described above, a ratio of a toner deposition rate on the light-sensing drum 102 vs the image input signal has changed to d'. For this reason, gradation in the initial state is different from that after passage of a specified period of time.

The fact that the gradation in the initial state and that after passage of a specified period of time is not identical to each other is not desirable from a viewpoint of image reproduction. So the following calibration is executed. Herein it is assumed that a relation in the initial state between an image input signal n in the first quadrant and laser output P is a linear one as indicated by the graph a). Namely, assuming a laser light volume for an image signal FFH is PMAX, the expression of P=PMAX/FF(H) x n is obtained.

Figure 16:
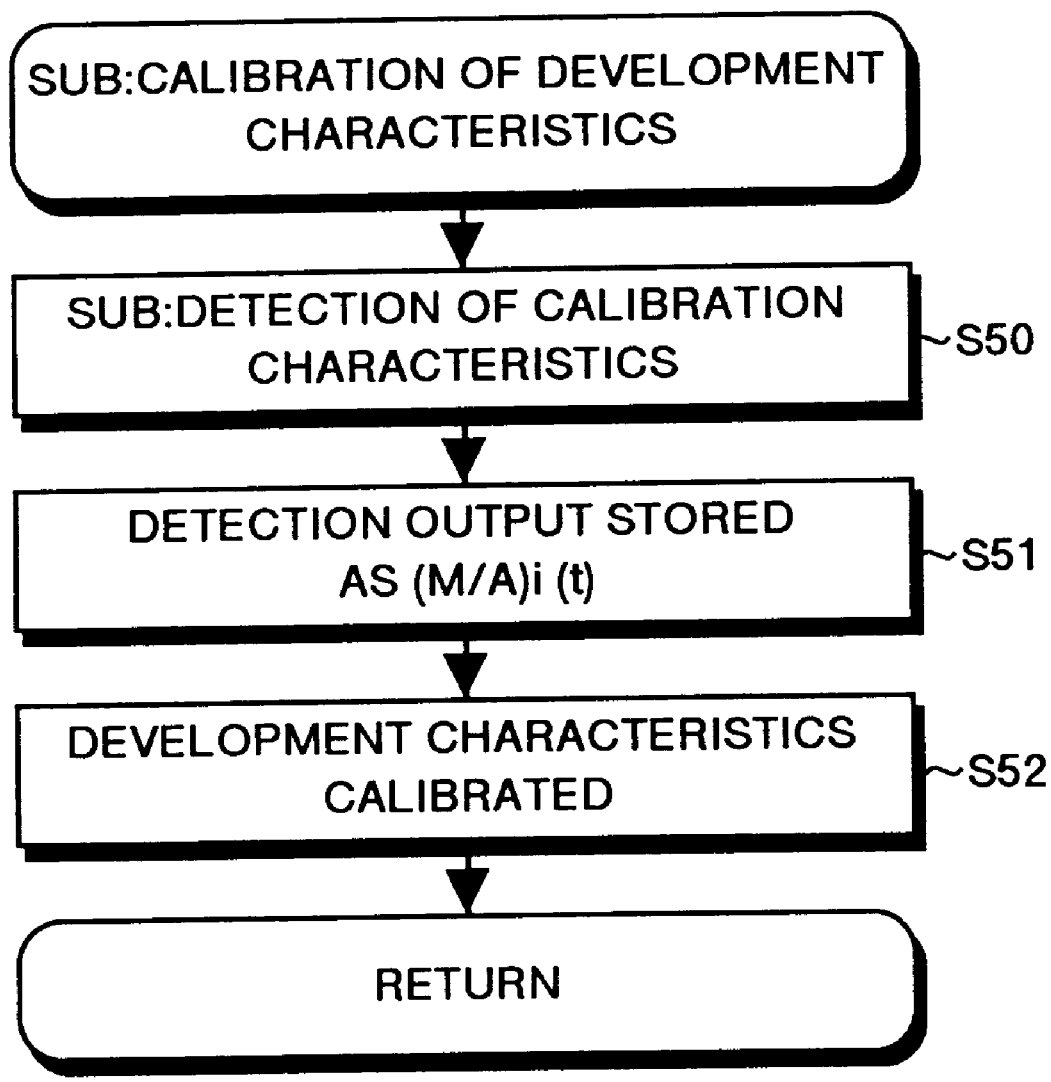
FIG. 16 is a flow chart showing a sequence in processing for calibration so that gradation having changed from that initially set after passage of a specified period of time apparently seems not to have changed.
Figure 17:
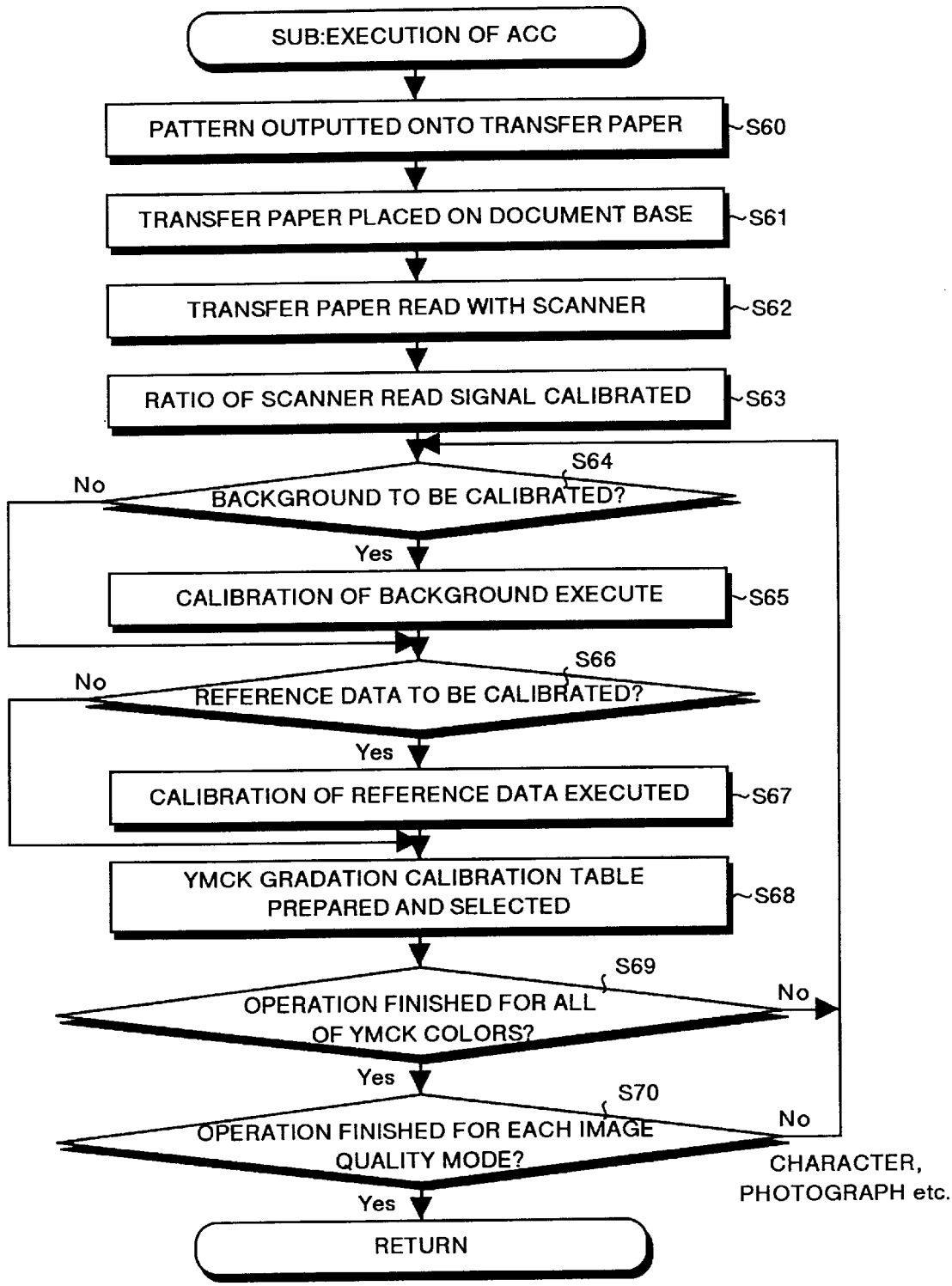
FIG. 17 is a flow chart showing a sequence in operations for automatically calibrating gradation in image density.
Figure 18:
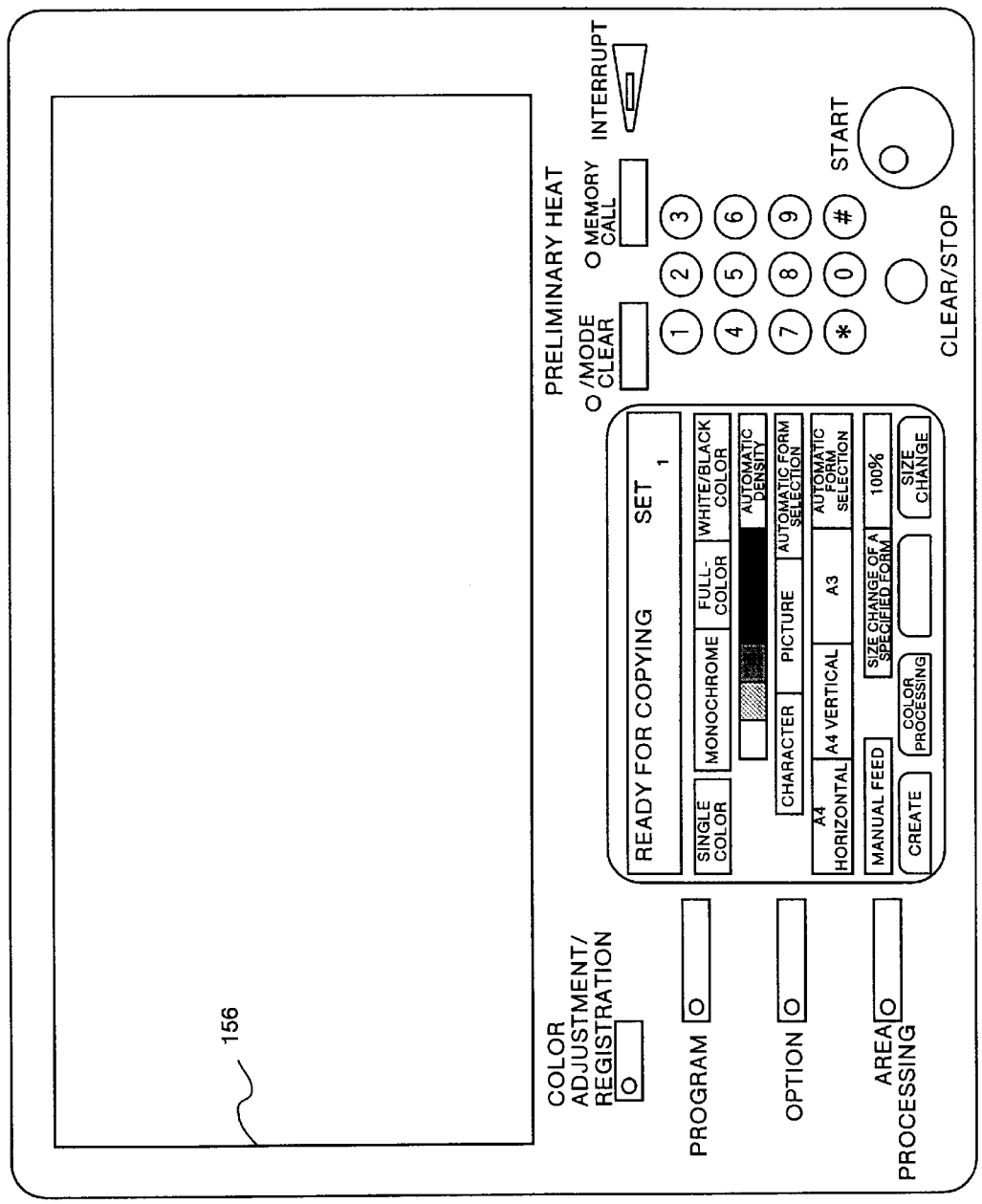
FIG. 18 is a view showing a liquid crystal screen showing an operating section.

Next description is made for processing for calibrating the gradation having changed after passage of a specified period of time from that in the initial state so that the gradation has not apparently changed with reference to the flow chart in FIG. 16.

At first, the development characteristics is detected according to the method described above (step 50), and a toner deposition rate (M/A) i (t) on the light-sensing drum 102 obtained from a result of detection by the optical sensor 136 as well as by the surface potential sensor 139 is stored in a memory (step 51). Herein t indicates current time t.

The development characteristics is corrected (step S52). When a relation between an image input signal and laser output is as indicated by a, laser output for the image input signal i is Pi, which indicates that a toner deposition rate on the light-sensing drum 102 has changed from (M/A) i (0) in the initial state to (M/A) i (t) after passage of a specified period of time.

On the other hand, laser output for the image input signal j is Pj, which indicates that a toner deposition rate on the light-sensing drum 102 has changed from (M/A) j (0) in the initial state to (M/A) j (t) after passage of a specified period of time.

In the case described above, especially when (M/A) i (0) is equal to (M/A) j (t), it is possible to apparently keep image density for an image input signal identical to that in the initial stage by changing a relation between an image input signal i to laser output after passage of a specified period of time from i→Pi to i→Pj.

The characteristics a' can be obtained by executing similar processing using np pieces of detection data. In this step, a value between actual measurement points can be given by executing linear interpolation or interpolation with a spline curve or the like.

The computing as described above may be executed, not to all the points, but to np pieces of data points detected or some points among the data points to select a look-up table stored in the ROM 416 using a value as a result of computing, and the value may be used as the calibration characteristics a'.

In the characteristics a' after a specified period of time obtained according to the method described above, assuming that laser output for the image input signal FFH is PMAX (t) and that for the image input signal FFH in the initial state is PMAX (0), as a method of calibration when PMAX (0) is not equal to PMAX (t), there is a method in which up to an image input signal k for PMAX (t)=Pk (0) is used keeping resolution between laser output P0 for the image signal 00H and PMAX (0), and also there is a method in which resolution for 8 to 10 bits is used for a section between laser output P0 for the image signal 00H and PMAX (t). In this embodiment, either one of the two methods may be used, and when the former one is used, as a maximum value of a laser-beam volume is not changed, controls for conditions for image formation are simple, but the number of substantial gradations is disadvantageously reduced.

Next description is made for operations for automatically calibrating image density (gradation) (ACC: Auto Color Calibration) with reference to the flow chart in FIG. 17.

Figure 19:
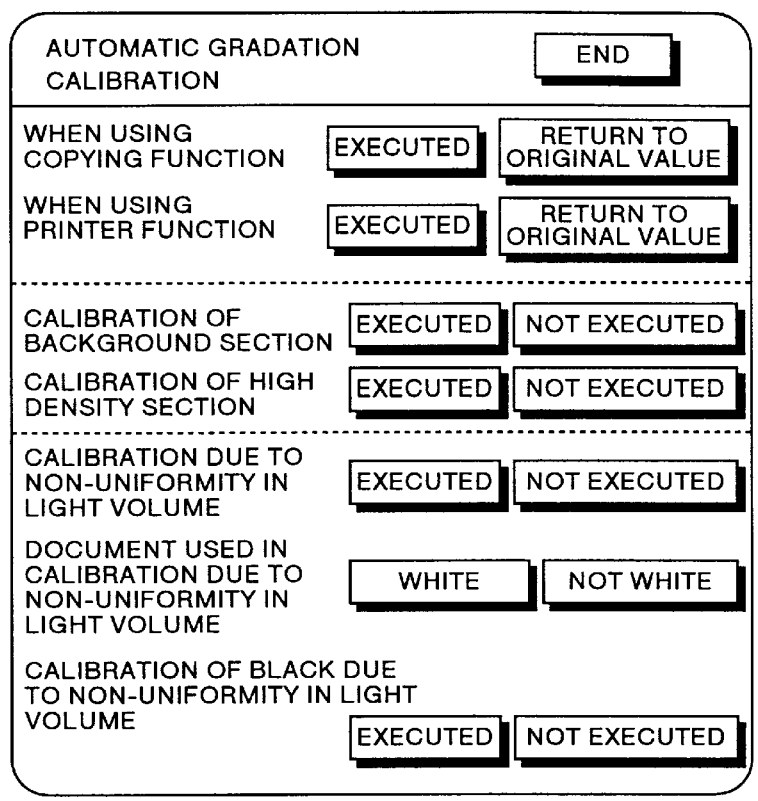
FIG. 19 is a view showing a screen with an ACC menu having been called thereon.
Figure 20:
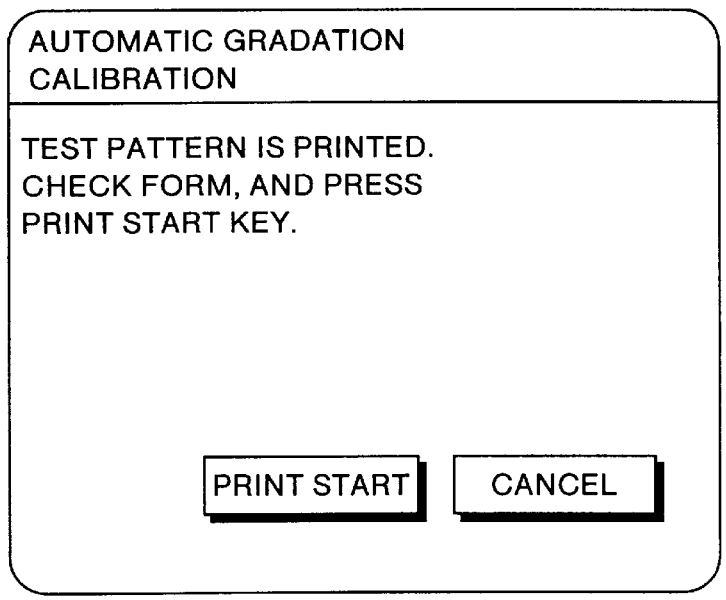
FIG. 20 is a view showing a screen which is displayed when "Execution" for automatic gradation calibration is selected.

On a liquid crystal screen of an operating section (Refer to FIG. 18), when the ACC menu is called, the screen shown in FIG. 19 is displayed. When [Execution] for ACC for using the function as a copying machine or the function as a printer is selected, the screen in FIG. 20 is displayed. When the function as a copying machine is selected, the gradation calibration table for use of the copying function is changed, and when the printing function is selected, a gradation calibration table for use of the printing function is changed both according to the reference data.

Figure 21:
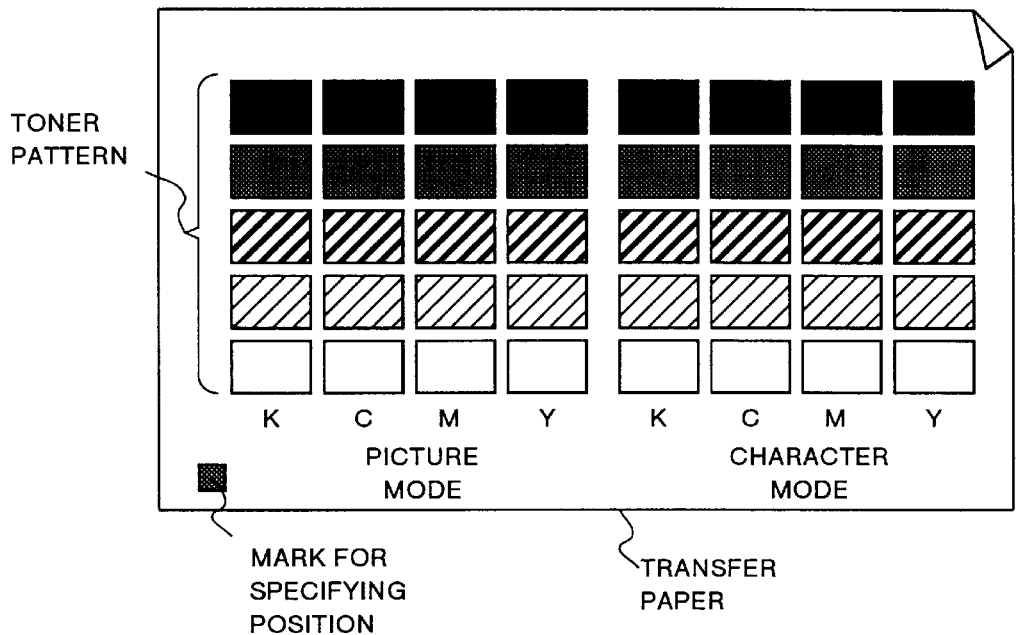
FIG. 21 is a view showing a plurality of density gradation patterns formed on a transfer member.

Herein, when the Print Start key in FIG. 20 is selected, as shown in FIG. 21, a plurality of density gradation patterns as shown in FIG. 21 each corresponding to each image quality mode such as each of Y, M, C and K colors, characters, and pictures are formed on a transfer material (step 60). The density gradation patterns are previously stored and set in a ROM of an IPU. A write value for each pattern is changed according to a result of detection of the development characteristics according to the method described below.

Herein description is made for a case, as an example, where 16 patterns of 00h, 11h, 22h, * *, EEh, FFh each expressed in the hexadecimal form are used.

This figure shows a patch of 5 gradations excluding those in the background section, but any arbitrary value can be selected among the 8-bit signals of 00h to FFh. In the character mode, dither processing such as pattern processing is not executed, and a pattern is formed with 256 gradations for 1 dot, and in the picture mode a write value for laser output is formed by allocating a sum of write values for two pixels adjoining to each other in the main scanning direction. Namely the pattern processing when a write value for the first pixel is n1 and that for the second pixel is n2 is, for instance, as follows:

In a case of n1+n2<255:
a write value for the first pixel: n1+n2
a write value for the second pixel: 0
In a case of n1+n2>255:
a write value for the first pixel: 255
a write value for the second pixel: n1+n2−255
or
In a case of n1+n2=128
a write value for the first pixel: n1+n2
a write value for the second pixel: 0
In a case of 128<n1+n2<256:
a write value for the first pixel: 128
a write value for the second pixel n1+n2−128
In a case of 256<n1+n2<383:
a write value for the first pixel:n1+n2−128
a white value for the second pixel 128
In a case of 383<n1+n2:
a write value for the first pixel 255
a write value for the second pixel: n1+n2−255

In addition to the allocation as described above, the pattern processing executed when an image is actually formed may be used.

Figure 22:
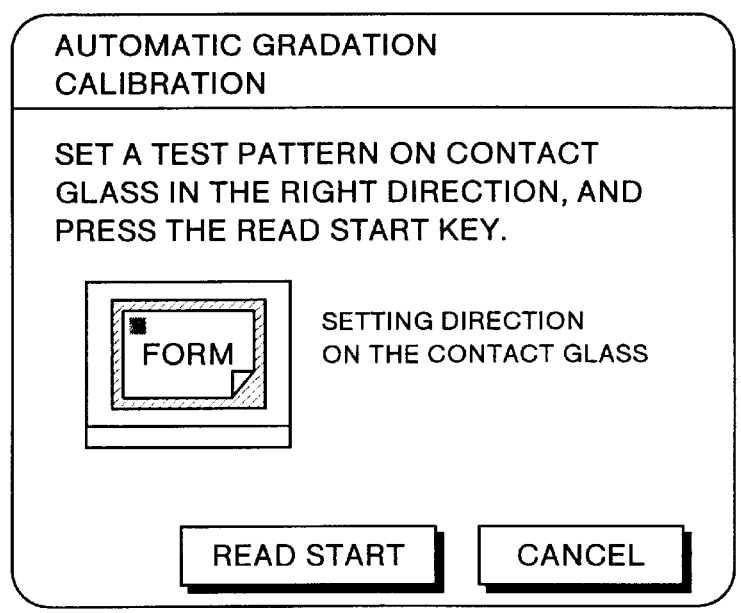
FIG. 22 is a view showing a screen displaying a message asking an Operator to place a transfer member on a document base after output of a pattern on the transfer member.

After a pattern is outputted onto a transfer material, the screen in FIG. 22 prompting placement of the transfer material on the document base 118 is displayed on the operating screen.

When the transfer material with a pattern having been outputted thereunto is placed on the document base 118 (step 61) and Read Start is selected, the scanner begins running and RGB data for the YMCK density pattern is read (step 62). In this step, data for a pattern section and those for the background section of the transfer material are read. Then the read value for the pattern is calibrated by using calibration values for RGB (step 63). When processing with data for the background is specified (step 64; Y), the background data processing for the read data is executed (step 65), and when calibration of the reference data is executed (step 66; Y), processing for a high image density section for the reference data is executed (step 67), and then preparation and selection of YMCK gradation calibration tables are executed (step 68).

Figures 23, 24:
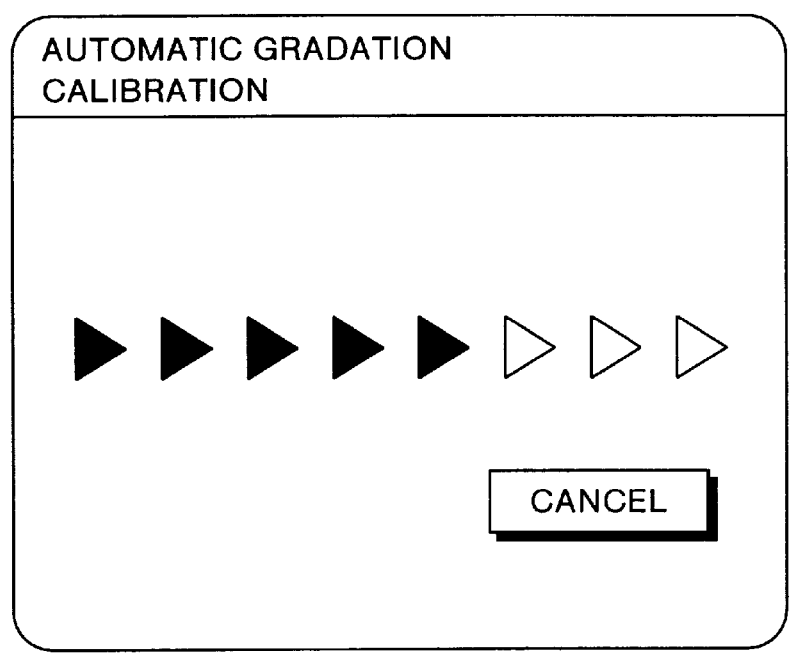
FIG. 23 is a view showing a screen during processing for automatic gradation calibration.
FIG. 24 is a table showing a calibration value for an RGB signal.

The above-described processing is executed for each color of YMCK (step 69) and also for each image quality mode of picture and characters (step 70). During this processing, the screen shown in FIG. 23 is displayed on the operating screen. The [Return to the previous screen] key is displayed in the screen shown in FIG. 19 so that any of the YMCK gradation calibration table before execution of the processing can be selected when a result of image formation according to the YMCK gradation calibration table after the processing is finished is not preferable.

Next description is made for calibration of the background.

A first object of calibration of the background is to calibrate a degree of a white color of a transfer material used in ACC. For, even if an image is formed with the same machine at the same time, a value read with a scanner varies according to a whiteness degree of a transfer material used. The demerit of not calibrating the parameter is that an appropriate image can not be obtained when, for instance, recycled paper with a low whiteness degree is used because generally recycled paper contains much yellow components, and to overcome this demerit, calibration is executed to reduce yellow components when a gradation calibration table for yellow is prepared. In this state, if copying is made using, for instance, art paper with a high whiteness degree, an image containing little yellow components is obtained, which makes it impossible to reproduce a desired color.

A second object of calibration of the background is to prevent a color of a pressure plate for holding down a transfer material from being read with a scanner through the transfer material when a thickness of the transfer material (paper thickness) used in ACC is small. For instance, if a machine called ADF (auto document feeder) is used in place of a pressure plate, a belt is used for carrying a document, but some rubber-based material used in this feed has a low whiteness degree, and is a little gray. For this reason, the color is read as an image signal apparently having a higher whiteness degree, so that processing for making the image thinner is made when a YMCK gradation calibration table is prepared. In this state, if thick paper with low transmittability is used, a generally thin image is reproduced, which is not preferable.

To prevent such a trouble as described above, calibration of am image signal read from a pattern section is made according to an image signal for the background section of the paper.

However, there is provided a merit also when the calibration as described above is not executed, and for instance, when transfer paper containing much yellow components such as recycled paper is used, color reproduction can be made better for colors containing yellow components when the calibration is not executed. Also when always thin transfer paper is used, a gradation calibration table suited to thin paper is prepared by not executing the calibration described above.

As described above, calibration of the background section may be or may not be executed according to the situation and to a user's choice.

Herein it is assumed that a write value for a gradation pattern formed on the light-sensing drum 102 is LD [i] (i=0, 1, ..., 9) and a vector of a value read with a scanner for the formed pattern is v [t] [i] (r [t], [i], g [t] [i], b [t] [i]) (t=Y, M, C, or K, i=1, 2, ..., 9). Such parameters as brightness, saturation, and hue angle (L*, C*, and h*) or brightness, reddishness, and bluishness (L*, a*, b*) maybe used in place of (r, g, b).

Herein it is assumed that read values for whiteness as a reference previously stored in the ROM 416 or RAM 417 are (r [W], g [W], and b [W]).

When a number of a pattern having certain image density is k-th (for instance, a pattern with the highest image density is selected as the k-th pattern), read values of a pattern for each toner for Y, M, C, and K (A r [t] [k], Ag [t] [k], A b [t] [k]) are decided as described below from read values for RGB signals (r [t] [i], g [t] [i], b [t] [i]).

$$\Delta r\,[t]\,[k]\,r\,[W]{-}r\,[t]\,[k]$$

$$\Delta g\,[t]\,[k]\,g\,[W]{-}g\,[t]\,[k]$$

$$\Delta b\,[t]\,[k]{=}b\,[W]{-}b\,[t]\,[k] \qquad (9)$$

On the other hand, the following percentage of RGB components in a read value of a pattern for each of the YMCK toners is stored in the RAM 41:

$$k\,[s]\,[t]{=}\{s{=}R,\,G,\,\text{or}\,B,\,t{=}Y,\,M,\,C,\,\text{or}\,K|k\,[s]\,[t]{\leq}1\} \qquad (10)$$

In the equation (6), k [s] [t] is a decimal value around 1, but the value is integral number data in a copying machine as follows:

$$k\,[s]\,[t]{=}k1\,[s]\,[t]/2^n$$

(k1 [s] [t] is an integral number of k1 [s] [t]/$2^n$) and for instance, n is equal to 10 (n=10), and $2^n$ is equal to 1024 ($2^n$=1024).

Using the values in equation (9) and equation (10), the scanner read value v [t] [i]=(r [t] [i], g [t] [i], and b [t] [i]) (t=Y, M, C, or K, i=0, 1, ..., 9) is calibrated as described below.

Description is made for a case of t=C (Cyan) as an example. RGB components in a read value for cyan toner are calibrated as follows:

$$r1\,[C]\,[i]{=}r\,[C]\,[0]{-}\Delta r\,[t]\,[k]{\times}k\,[r]\,[t]$$

$$g1\,[C]\,[i]{=}g\,[C]\,[0]{-}\Delta g\,[t]\,[k]{\times}k\,[g]\,[t]$$

$$b1\,[C]\,[i]{=}b\,[C]\,[0]{-}\Delta b\,[t]\,[k]{\times}k\,[b]\,[t] \qquad (11)$$

and these values are used as new (r [t] [i], g [t] [i], b [t] [i]). The coefficients used in this step are shown in the table in FIG. 24.

Figure 25:
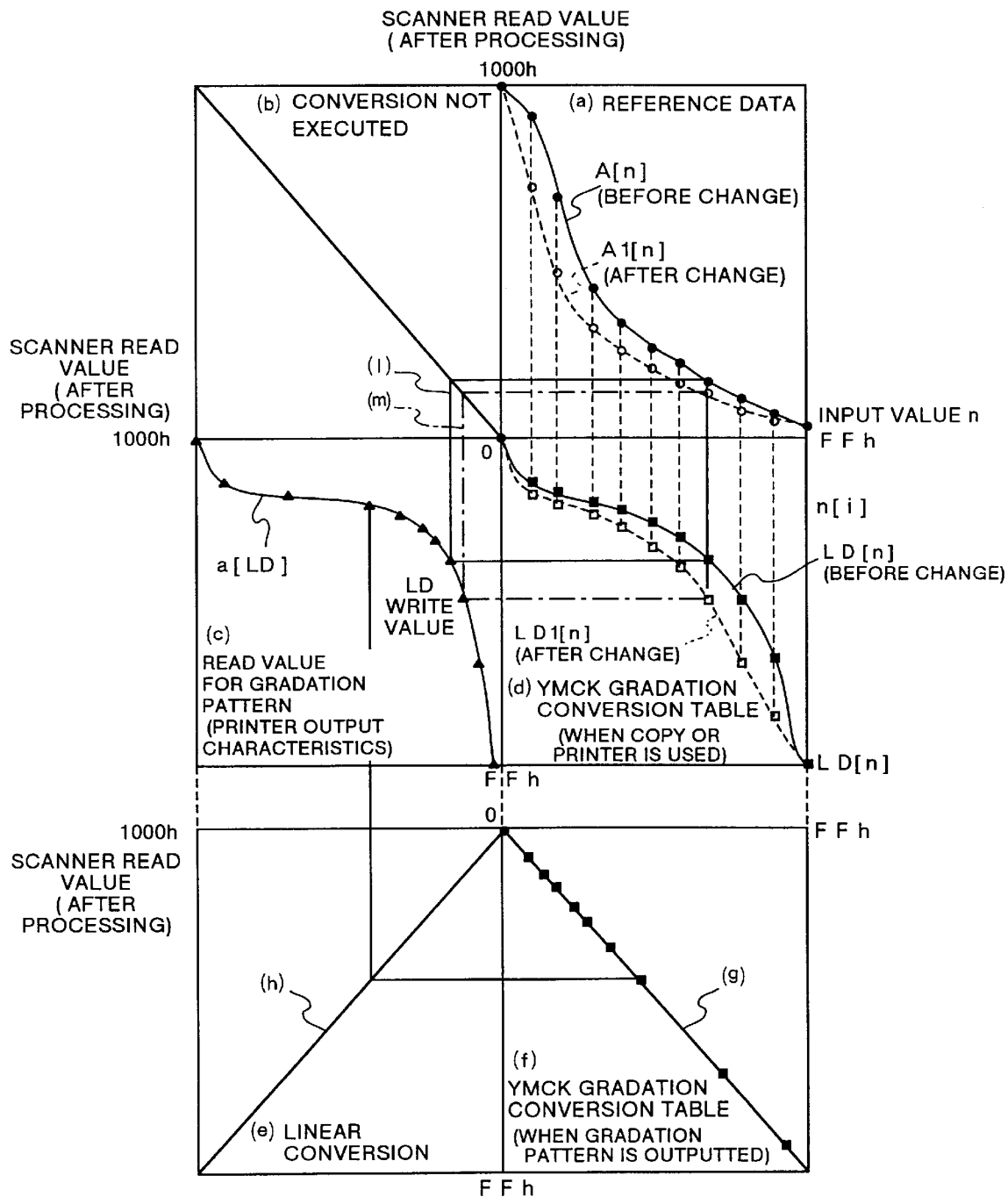
FIG. 25 is a view for illustrating a method of preparing a gradation conversion table executed in the γ calibration processing section during execution of ACC.

Next description is made for a method of preparing a gradation conversion table (LUT) in the γ conversion processing section 410 when ACC is executed with reference to FIG. 25.

The horizontal axis of the first quadrant in FIG. 25 indicates a write value for a gradation pattern, while the vertical axis indicates a read value for the gradation pattern outputted onto transfer paper, and this shows a relation between a write pattern for the gradation pattern and a value read with a scanner. The horizontal axis of the second quadrant indicates a toner deposition rate on the light-sensing drum 102, and this shows a relation between a toner deposition rate on the light-sensing drum 102 and a value read with a scanner. The vertical axis of the third quadrant indicates development potential, which indicates development characteristics of a printer.

The development potential indicates a difference between surface potential on the light-sensing drum 102 and a DC component of development bias, and the larger the difference is, the larger a quantity of toner deposition on the light-sensing drum 102 is. The fourth quadrant indicates a relation between the development potential and a write value for a gradation pattern.

The reference numerals n [0], n [1] on the horizontal axis of the first quadrant indicates write values in the first and second stages of a gradation pattern. In a read value for a pattern v [t] [i]=(r [t] [i], g [t] [i], b [t] [i]), image signals for complement colors for YMC toners are b [t] [i], g [t] [i], and r [t] [i] respectively, so that only image signals for the complement colors are used. Herein to simplify the subsequent description, description is made using a [t] [i] (i=0, 1, 2, . . . , 9; t=C, M, Y, or K). Preparation of a gradation conversion table simplifies the processing. It should be noted that, although sufficient precision is achieved by using any image signal for RGB in a case of black toner, a G (green) component is used herein.

The reference data is given as a combination of a scanner read value v0 [t] [i]=(r 0 [t] [i], g0 [t] [i], b0 [t] [i] and a corresponding laser write value LD [i] (i=1, 2, . . . , 10).

Similarly to simplify the subsequent description, A [t] [n [i]] is expressed as (0≦n [i]≦255, i=1, 2, . . . , 10, t=Y, M, C, or K) using complement image signals for YMC.

The YMCK gradation conversion table is obtained by comparing the a [LD] described above and the reference data A [n] stored in the ROM 416. Herein n indicates an input value into the YMCK gradation conversion table, while the reference data A [n] is a target value for image signals obtained by reading YMC toner patterns outputted according to the laser write value LD [i] after the input value n is subjected to YMCK gradation conversion. Herein the reference data is classified to reference data A [n] requiring calibration according to image density which a printer can output and that A [n] not requiring the calibration. Determination as to whether the calibration should be executed or not is made according to data for determination previously stored in a ROM or a RAM and described later. Description is made for the calibration hereinafter.

By computing LD corresponding to A [n] from the a [LD] described above, a laser output value LD [n] corresponding to the input value n into the YMCK gradation conversion table is obtained. The gradation conversion table can be obtained by computing the laser output value LD [n] for each input value i of 0, 1, . . . , 255 (in a case of an 8-bit signal).

In this step, in place of executing the above-described processing for all values for the input value n (00h, 01h, . . . , FFh in hexadecimal form) to the YMCK gradation conversion table, the processing is executed to values at intervals such as ni=0, 11h, 22h, . . . FFh, and interpolation with the spline function is executed for other points, or a table for a conversion curve passing through or closest to a combination of (0, LD [0]), (11h, LD [11h]), (22h, LD [22h]), . . . , (FFh, LD [FFh]) obtained through the above-described processing is selected among the YMCK γ calibration tables previously stored in the ROM 416.

Figure 26:
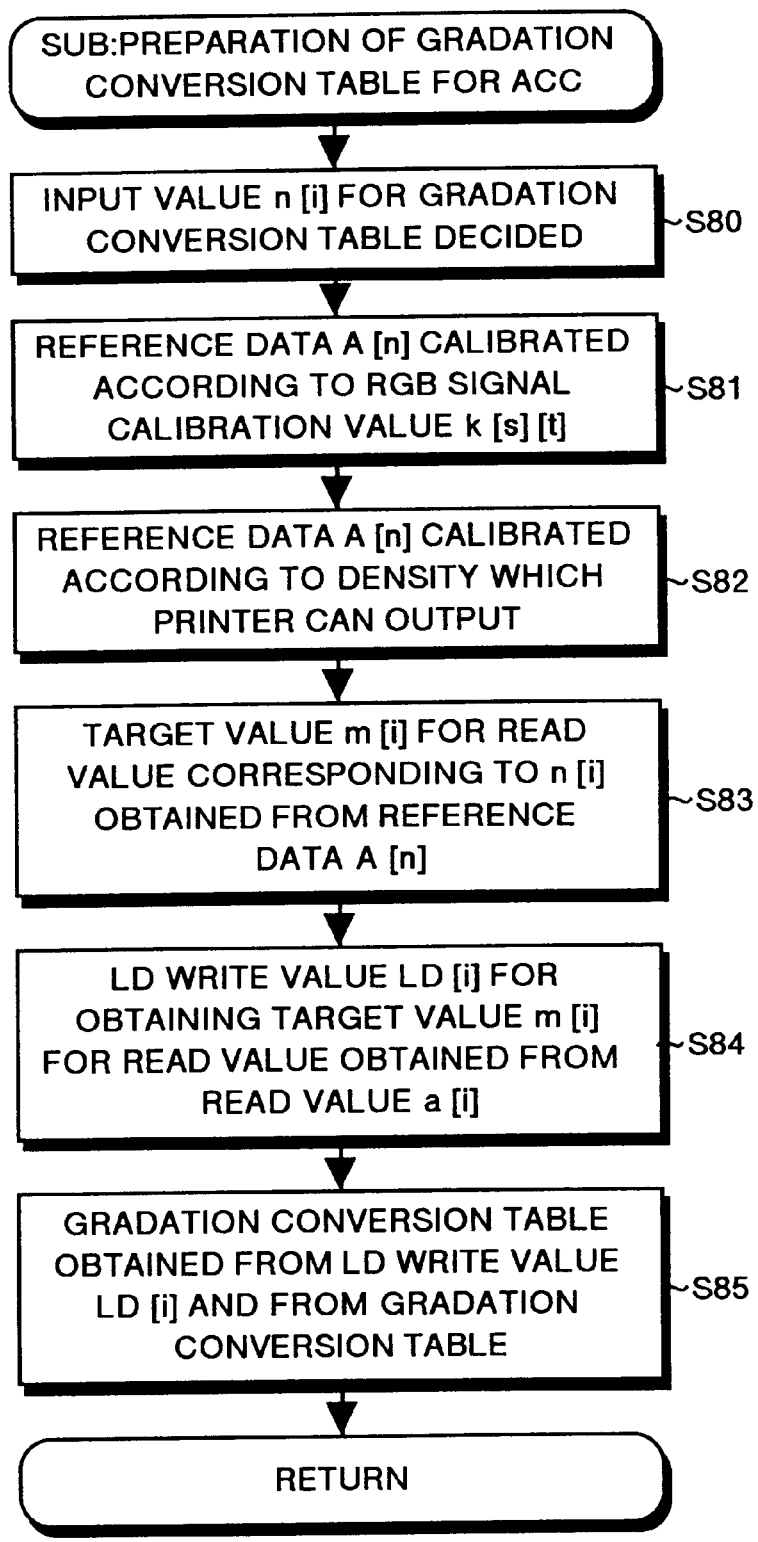
FIG. 26 is a flow chart showing a sequence in preparation of a gradation calibration table during execution of ACC.

Next description is made for the computing sequence with reference to the flow chart in FIG. 26.

At first, a necessary input value for obtaining the YMCK γ calibration table is decided (step 80). Herein it is assumed that n [i]=11 (h)×i (i=0, 1, . . . , imax=15). Then the reference data is calibrated using calibration values for the RGB signals according to the sequence described above (step 81), and also the reference data A [n] is calibrated according to the image density which the printer can output (step 82).

Next it is assumed that a write value for laser output enabling the maximum image density obtainable in a printer section is FFh (hexadecimal number) and that a read value m [FFh] for the pattern then is mmax. Then there are reference data A [i] (i=1, 2, . . . , i1) not subjected to calibration in a range from the low image density area to the intermediate image density area, reference data A [i] (i=i2+1, . . . , imax-1) (i2≧i1, i2≧imax-1) in the side of high image density not subjected to calibration, and reference data A [i] (i=i1+1, . . . , i2).

Next description is made for specific method of computing assuming an image signal proportional to a reflection factor of a document and not requiring RBG-γ conversion. Of the reference data not subjected to calibration, a difference A ref between the reference data A [i2+1] with lower image density than that in the high image density area and reference data A [i1] with lower image density than that in the low image density area is computed. Namely, computing is made through the following equation:

$$\Delta ref = A[i1] - A[i2+1] \quad (12)$$

Herein, in a case of a linear reflection factor or linear brightness degree not requiring RBG-γ conversion as processing for inversion, the difference Δref is larger than zero (0). Similarly the different Δdet is computed from a read value mmax for a pattern for which the maximum image density can be obtained in the printer section. Namely the following computing is executed:

$$\alpha det = A[i1] - mmax \quad (13)$$

From the equations (12), (13), the reference data having being subjected to calibration in the high density section A [i] (i=i1+1, . . . , i2) are as expressed by the following equation:

$$A[i] = A[i1] + (A[i] - A[i1]) \times (\Delta det/\Delta ret)(i=i1+1, i1+2, \ldots, i2-1, i2) \quad (14)$$

Then an scanner read image signal m [i] corresponding to n [i] is obtained from the reference data A [n] (step 83).

Actually the reference data A [n [j]] (0≦n [i]≦255, j=0, 1, . . . , jmax, n [j]≦n [k] for j≦k) corresponding to the values n [j] at intervals are obtained as described below.

At first (0≦j≦jmax) satisfying the condition of n [j]≦n [i]≦-n [j+1] is obtained. In a case of an 8-bit image signal, the computing becomes easier by executing the computing assuming that n [0]=0, n [jmax]=255, n [jmax+1]=n [jmax]+1, and A [jmax+1]=A [jmax].

As for intervals of reference data points, the smaller the n [j] is, the higher precision of the γ calibration table finally obtained is.

m [i] is computed from the j obtained as described above through the following equation (step 84).

$$m[i] = A[j] - (A[j+1] - A[i]) \cdot (n[i] - n[j])/(n[j+1] - n[j]) \quad (15)$$

Although interpolation is made by way of using a primary expression, but interpolation may be made by using a higher-dimensional function or the spline function. In that case, it is assumed that m [i] is equal to f (n [i]). In a case of k-dimensional function, $f(x)=\Sigma b_i x_i$ (It is assumed that the addition range i is from 0 to k).

Then a write value LD [i] of LD for obtaining m [i] obtained in step 83 is obtained according to a sequence similar to that in step 83.

When an image signal not having been subjected to RGB-γ conversion is processed, as a value of LD becomes larger, the a [LD] becomes smaller. In other words, when LD [k] is smaller than LD [k+1], a [LD [k]]≧a [LD [k+1]].

Herein it is assumed that the 10 values of LD [k]=00h, 11h, 22h, . . . , 66h, 88h, AAh, FFh (k=0, 1, . . . , 9) are used in pattern formation. For in a case of image density with a small toner deposition rate, a scanner read value for a toner deposition rate largely varies, so that intervals of pattern write values LD [k] are made smaller, and in a case of image density with a larger toner deposition rate, a scanner read value for a toner deposition rate little varies, so that the intervals are set larger in reading.

The merits provided by this scheme include that a toner consumption rate can be suppressed to a lower level as compared to that in a case where the number of patterns are increased as indicated by LD [k]=00h, 11h, 22h, . . . , EEh, FFh (totally 16 points), and that variance for an LD write value is small in a high image density area, and further as a read value may easily be inverted due to effects by non-uniformity in a surface potential on the light-sensing drum 102, non-uniformity in toner deposition, non-uniformity in fixing, or non-uniformity in potentials, use of shorter intervals of LD write values is not always effective in improvement of precision, and for the reasons as described above, the patterns are formed with the LD write values as described above.

For LD [k] satisfying the condition of a[LD [k]]≧m [i]>a[LD [k+1]], the following equation is applied:

$$LD [i]=LD [k]+(LD [k+1]-LD [k])\cdot(m [i]-a[LD [k]]/a[LD [k+1]]-a[LD [k]]) \quad (16)$$

Assuming that 0≦k≦kmax (kmax>0), in a case of a [LD [kmax]]>m [i] (when a target density for image density obtained from the reference data is high), extrapolation using a primary equation is executed for estimation applying the following equation:

$$LD [i]=LD [k]+(LD [kmax]-LD [kmax-1])\cdot(m [i]-a [LD [kmax-1]])/a [LD [kmax]]-a [LD [kmax-1]]) \quad (17)$$

With this operation, a pair of an input value n [i] into the YMCK γ calibration table and an output value LD [i] (n [i], LD [i]) (i=0, 1, . . . , 15) is obtained.

Then, according to the obtained part of the input value n [i] and output value LD [i] (i=0, 1, . . . , 15), interpolation is executed using the spline function or a γ calibration table stored in an ROM is selected (step 245).

Next description is made for a method of calibrating an output value for a gradation pattern used for ACC according to another embodiment of the present invention according to a result of detection of development characteristics.

Figure 27:
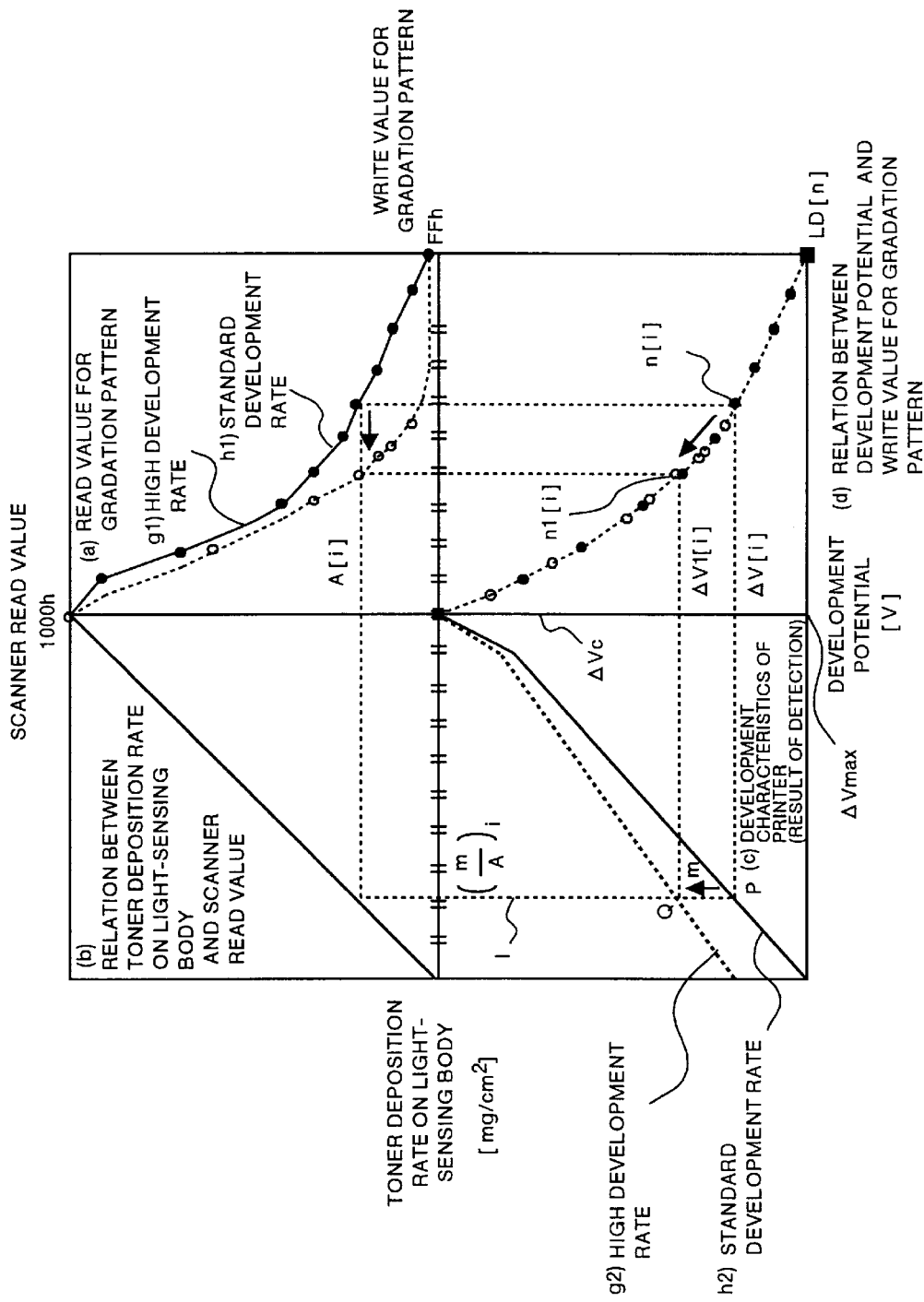
FIG. 27 is a view for illustrating a method of calibrating an output value for a gradation pattern used for ACC according to a result of detection of development characteristics according to another embodiment of the present invention.

The horizontal axis of the first quadrant in FIG. 27 indicates a laser write value for a gradation pattern, while the vertical axis indicates a read value for a gradation pattern outputted onto transfer paper, which indicates a relation between a write value for a gradation pattern and a scanner read value. The horizontal axis of the second quadrant indicates a toner deposition rate on the light-sensing drum 102, which indicates a relation between a toner deposition rate on the light-sensing drum 102 and a scanner read value. The vertical axis of the third quadrant indicates a development potential, which indicates development characteristics of a printer. The development potential indicates a difference between a surface potential on the light-sensing drum 102 and a DC component of development bias, and as this value becomes larger, a toner deposition rate on the light-sensing drum 102 becomes larger. The fourth quadrant shows a relation between the development potential and a write value for a gradation pattern.

The development characteristics g2) for a case where "the development rate is high" in the third quadrant and development characteristics h2) for "development rate is standard" also shown in the third quadrant can be obtained from a result of detection of a gradation pattern formed on the light-sensing drum 102 by the surface potential sensor 130 as well as by the optical sensor 136. A result of output of a gradation pattern onto transfer paper under conditions for the development characteristics g2) and h2) is as indicated by the graph g1) and graph h1) in the first quadrant.

When the development characteristics h2) is regarded as standard, a toner deposition rate on the light-sensing drum 102 for a pattern formed according to the write value n [i] is (M/A) i, the development potential is ΔV [i], and a scanner read value is A [i]. When the development characteristics newly detected is g2), a write value for a gradation pattern for obtaining (M/A) i as a toner deposition rate on the light-sensing drum 102 is n1 [i] in the fourth quadrant.

To obtain a toner deposition rate (M/A) i on the light-sensing drum 102 and a scanner read value A[i] for a printer with the standard development characteristics h2), it is required to set the development potential to A V1 [i] and a write value for the gradation pattern to n1 [i].

The development potential ΔV1 [i] given when a point P ((M/A) i, ΔV [i]) in the third quadrant is moved along the string 1 in the direction indicated by the arrow mark m according to a cross point Q ((M/A) i, Δ, V1 [i]) with the curve for development characteristics g2) is the development potential appropriate when i-th gradation pattern is formed. The laser write value is n1 [i] as shown by the graph in the fourth quadrant.

As described above, when the optical sensor 136 is used, because of the functional limit of the optical sensor 136 that a quantity of reflected light from toner on the light-sensing drum 102 is detected, a high toner deposition rate can not be detected, but when the optical sensor 136 is used together with the potential sensor 139, by estimating a toner deposition rate in an area where the optical sensor 136 is not operable effectively according to a result of detection by the potential sensor 139, thus the problem described above being solved.

When a toner deposition rate on the light-sensing drum 102 is estimated from a result of detection with the potential sensor 139, a development potential is obtained from a surface potential of the light-sensing drum as well as from a DC component of development bias assuming that toner is deposited on the light-sensing drum in proportion to the development potential.

Figure 28:
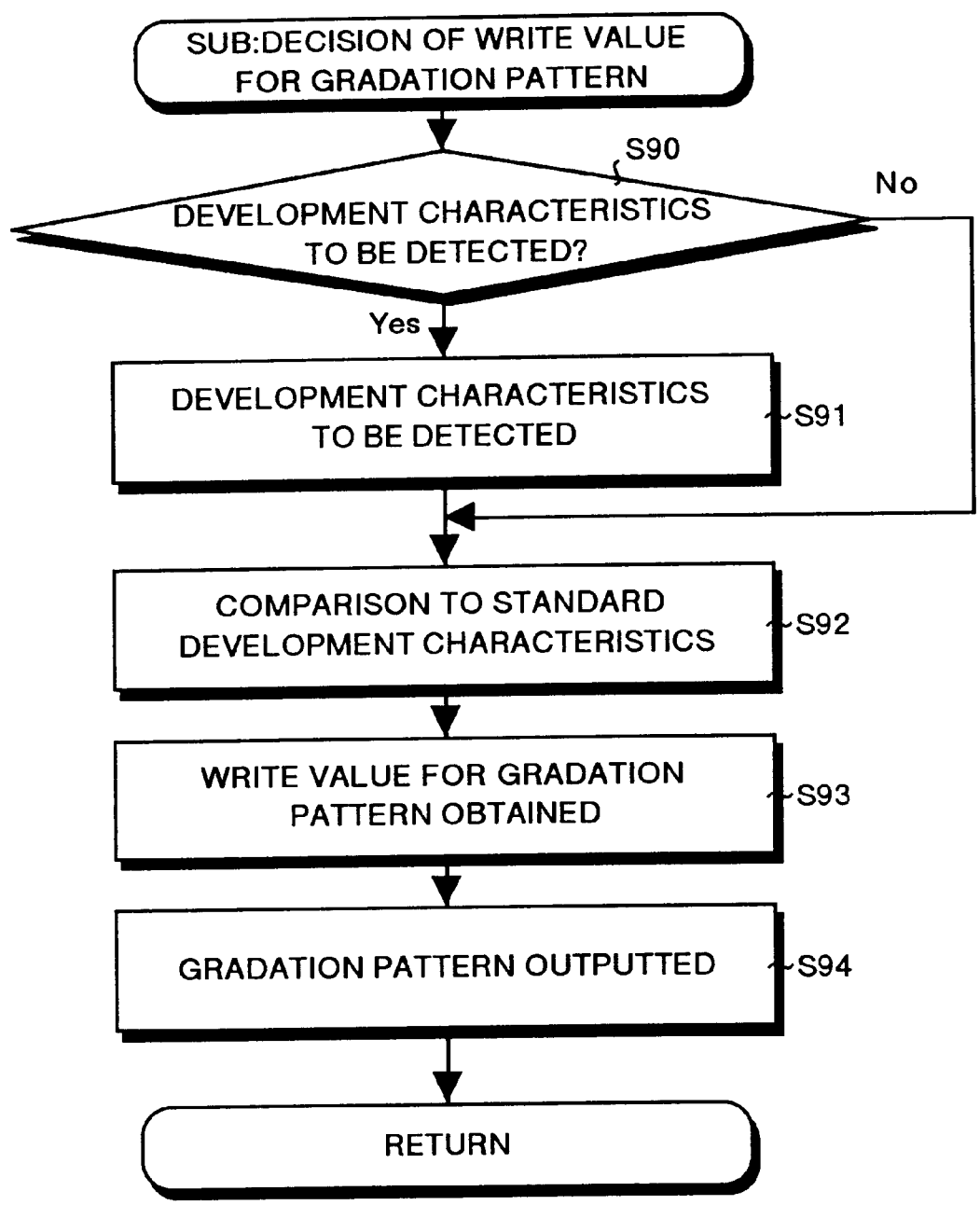
FIG. 28 is a flow chart showing a sequence in decision of a write value for a gradation pattern.

Next description is made for the processing sequence with reference to the flow chart in FIG. 28.

At first, determination is made as to whether the development characteristics is to be detected or not (step 90), and detection of the development characteristics should not always be executed just before execution of ACC, and may be executed in output of a specified number of sheets of transfer paper after previous detection of development characteristics (such as once for every 100 sheets of transfer paper), or in a case where a fixing temperature is lower than a specified value when power to the basic system is turned ON.

If it is determined that detection of development characteristics is not required to be executed (step 90: N), a result of previous detection of development characteristics is read out from a memory with detected data stored therein.

If it is determined that detection of the development characteristics is required (step 90: Y), the development characteristics is detected (step 91), and the detected development characteristics is compared to the standard development characteristics stored in the memory (step 92). Then a write value for the gradation pattern is changed according to a result of comparison (step 93). A pattern for ACC is outputted according to the result (step 94). Then the ACC processing described below is executed.

A case in which a toner deposition rate on the light-sensing drum 102 (M/A) ($\Delta$V) is proportional to the development potential $\Delta$V in the third quadrant in FIG. 27 at $\Delta$Vmax (development potential for the write value FFh) and also at (M/A)$\geq$0 can be expressed by the following equation:

$$(M/A)(\Delta V) = k(h) \times \Delta V + \Delta VK \ (h) \ (\Delta V \leq \Delta Vmax \text{ and at the same time } (M/A \geq 0)) \quad (18)$$

for the development characteristics h2); or by the following equation:

$$(M/A) \ (\Delta V) = k \ (g) \times \Delta V + \Delta VK \ (g) \ (\Delta V \leq \Delta Vmax \text{ and at the same time } (M/A \geq 0)) \quad (19)$$

for the development characteristics g2).

Herein k (h) and k (g) indicate inclination (called toner deposition rate $\gamma$), while $\Delta$Vk (h) and $\Delta$Vk (g) are constants each indicating a tangent to the vertical axis (called development start potential).

When coordinate values of the point P ((M/A) i, $\Delta$V [i]) and point Q ((M/A) i, $\Delta$V1 [i]) are introduced, a value of a toner deposition rate on the light-sensing drum 102 is (M/A) i and common to the two points, and further K (h)$\times\Delta$V [i]+$\Delta$VK (h)=k (g)$\times$V1 [i]+Vk (g) is satisfied, the equation (18) is equation (19) shown below, and for this reason the A V1 [i] is obtained through the equation (19):

$$V1 \ [i] = (1/k \ (g))\{k \ (h) \times \Delta V \ [i] + \Delta VK \ (h) - \Delta VK \ (g)\} \quad (20)$$

The laser write value n1 [i] for obtaining A V1 [i] is obtained from the graph in the fourth quadrant. This graph is obtained from a result V [i] of detection of a surface potential when a gradation pattern for the laser write value n [i] is formed by subjecting the result to the conversion of $\Delta$V [i]=VB–V [i], Herein VB indicates a value of a DC component in development bias. In the example described above, $\Delta$V$\leq\Delta$Vmax and at the same time (M/A)$\geq$0 are assumed for a range of development potential, and this is the same as the conditions of $\Delta$VK (g)$\leq\Delta$V<$\Delta$Vmax and $\Delta$VK (h)$\leq$–$\Delta$V<$\Delta$Vmax when the development start potentials of $\Delta$VK (g) and $\Delta$VK (h) are used.

Figure 29:
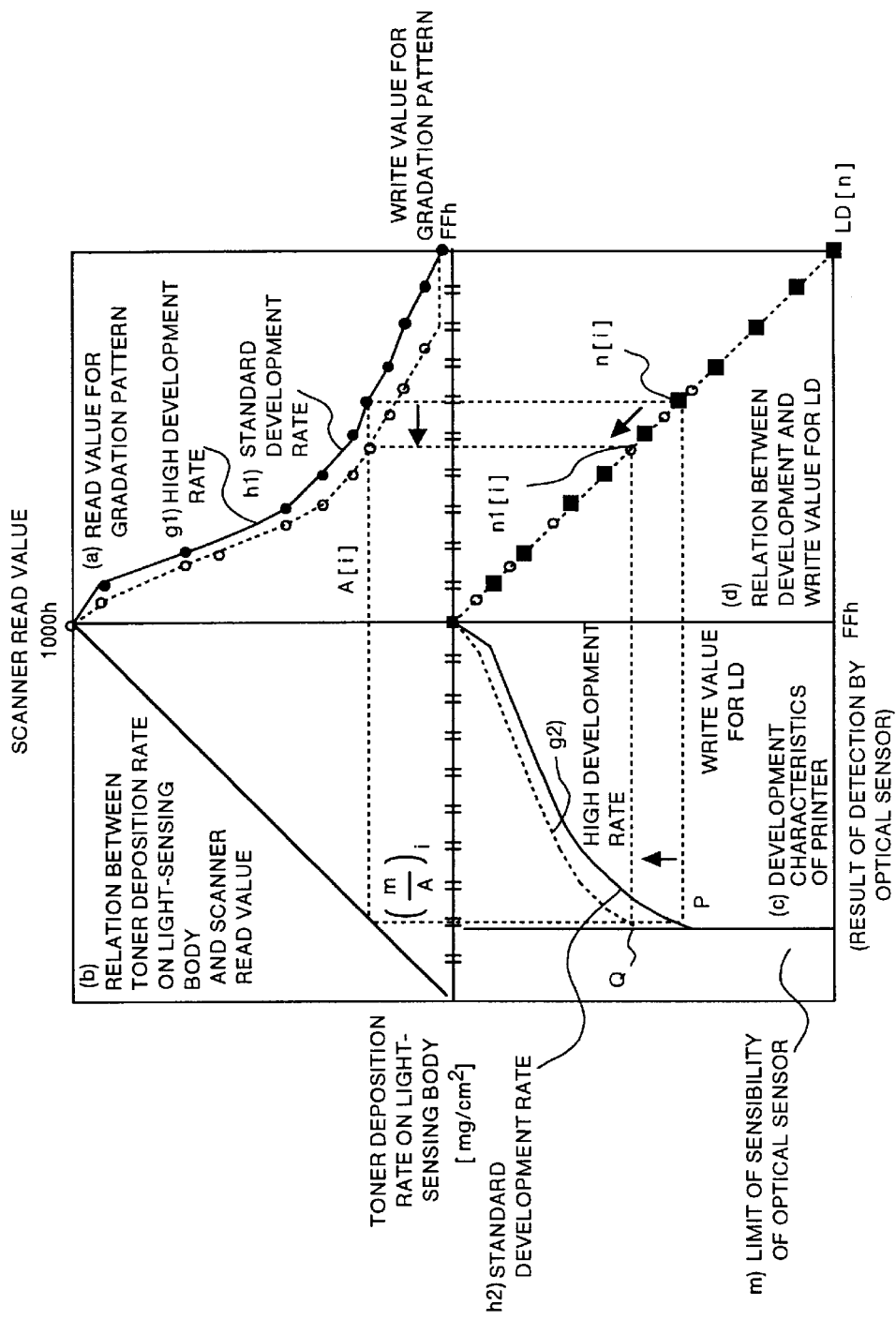
FIG. 29 is a view showing a relation between a write value for a gradation pattern and a read value read with a scanner, a relation between a toner deposition rate and a read value read with a scanner, and a relation among development characteristics of a printer, a write value for LD and a write value for the gradation pattern.
Figure 31:
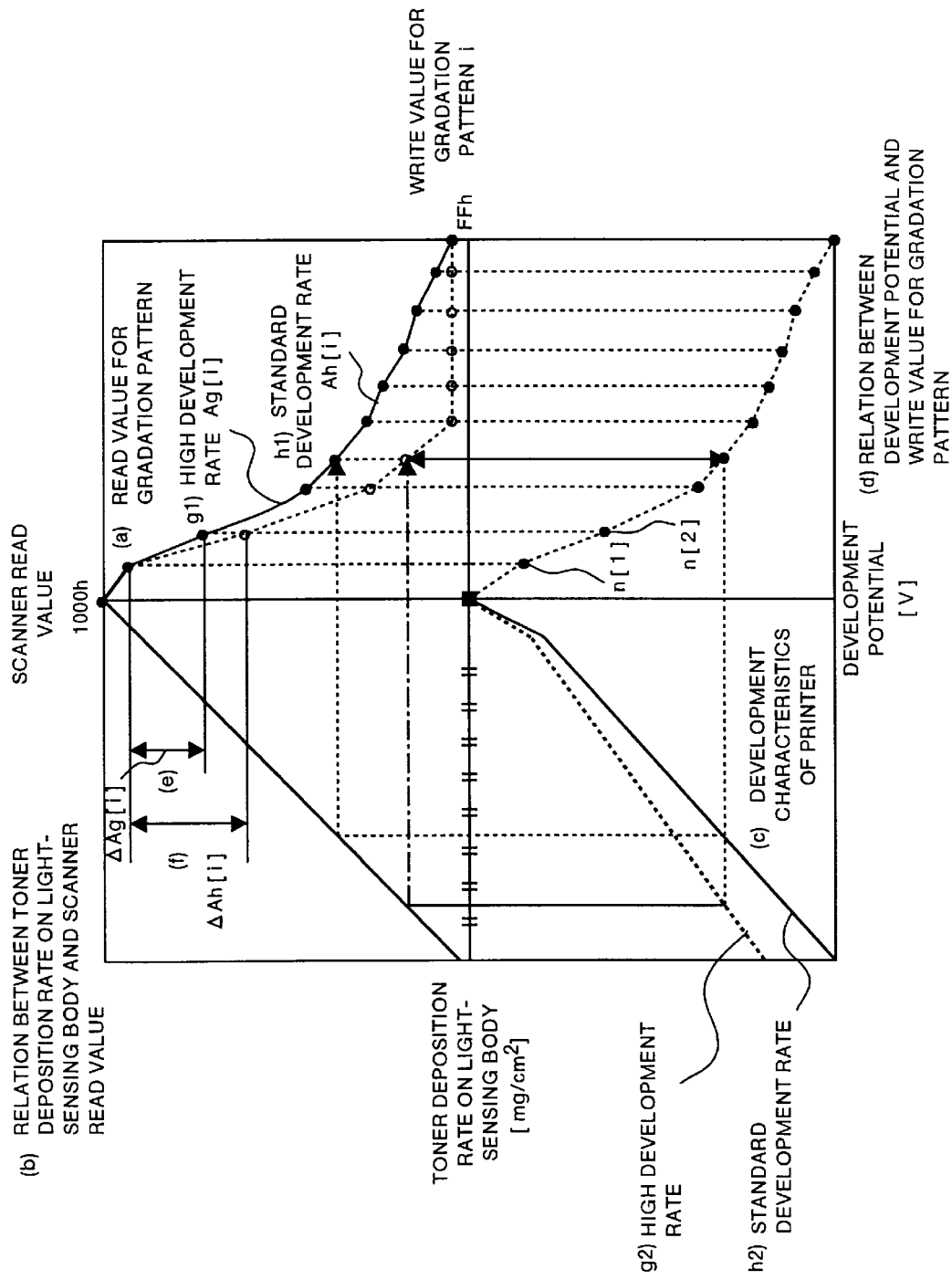
FIG. 31 is a view that the precision in adjustment may not be stabilized when there are a small number of gradation patterns like in the conventional technology.

Next description is made for another embodiment of the present invention with reference to FIG. 29.

The horizontal axis of the first quadrant in FIG. 29 indicates a laser write value, while the vertical axis indicates a read value for a gradation pattern outputted onto transfer paper, which shows a relation between a write value for the gradation pattern and a scanner read value. The horizontal axis of the second quadrant indicates a toner deposition rate on the light-sensing drum 102, and shows a relation between a toner deposition rate on the light-sensing drum 102 and the scanner read value. The vertical axis of the third quadrant indicates a laser (LD) write value, which indicates development characteristics of the printer, and the fourth quadrant shows a relation between an LD write value and a write value for a gradation pattern, which is the same as that in the embodiment above.

The development characteristics g2) for a case of "high development rate" shown in the third quadrant and development characteristics h2) for the case of "standard development rate" also shown in the third quadrant can be obtained from a result of detection for a gradation pattern formed on the light-sensing drum 102 by the optical sensor 136 using the method described above. However, because of the functional limit of the optical sensor 136 that a quantity of reflected light from toner on the light-sensing drum 102 is detected, a toner deposition rate higher than the limit for the optical sensor 136 indicated by m) in the figure can not be detected. Therefore, only area for toner deposition rate lower than that showed by m) is used. A result of output of a gradation pattern onto transfer paper under the conditions of the development characteristics g2) and h2) is as indicated by the graph g1) and graph h1) in the first quadrant.

When the development characteristics h2) is regarded as the reference, a toner deposition rate on the light-sensing drum 102 for a pattern formed according to the write value n [i] is (M/A) i, the write value is n [i], and the scanner read value is A [i].

When the newly detected development characteristics is g2), a write value for a gradation pattern for obtaining (M/A) i as a toner deposition rate on the light-sensing drum 102 is n1 [i] in the fourth quadrant.

To obtain a toner deposition rate (M/A) i on the light-sensing drum 102 and a scanner read value A [i] for a printer with the standard development characteristics h2), a write value for the gradation pattern should be set to n1 [i].

A write value given when a point P ((M/A) i, n [i]) is moved along the string 1 in the direction indicated by the arrow mark m by a cross point Q ((M/A) i, n1 [i]) is a value appropriate for forming a gradation pattern.

This application is based on Japanese patent application No. HEI 9-275003 filed in the Japanese Patent Office on Aug. 20, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus comprising:
   an image reading unit configured to read a document image by way of optically reading the document image;
   an image processing unit configured to convert an input image signal from the image reading unit and to output the converted input image signal as an output image signal by use of an image signal conversion table incorporated in said image processing unit;
   a writing unit configured to write information on an image carrier according to said output image signal;
   an image forming unit comprising said image carrier and configured to form an image on a transfer material;
   a gradation pattern image signal generating unit configured to generate a plurality of gradation patterns to be recorded on said transfer material;

a unit configured to prepare and select an image signal conversion table according to a signal read by said image reading unit from said plurality of gradation patterns recorded on the transfer material; and a detecting unit configured to detect a relation between a surface potential and a toner deposition rate on the image carrier; wherein a write signal level for a gradation pattern formed on said transfer material is changed according to a result of detection by said detecting unit.

2. An image forming apparatus according to claim 1 further comprising:

a light-sensing unit configured to detect a reflected light from a transmitting light through the gradation pattern visualized on the image carrier; wherein the relation between a surface potential and a toner deposition rate on the image carrier is detected by said detecting unit according to a result of detection by said light-sensing unit.

3. An image forming apparatus according to claim 2 further comprising a surface potential detecting unit configured to detect a surface potential of a gradation density pattern; wherein the relation between a surface potential and a toner deposition rate on the image carrier is detected according to a result of detection by the surface potential detecting unit as well as to a result of detection by said light-sensing unit, and a write value for a gradation pattern formed on the transfer material is changed according to the relation detected.

4. An image forming apparatus comprising:

an image reading unit configured to read a document image by way of optically reading the document image;

an image processing unit configured to process an image signal from the image reading unit and to output the processed signal as an output image signal by use of an image signal conversion pattern incorporated in said image processing unit;

an image writing unit configured to write information on an image carrier according to said output image signal from the image processing unit;

an image signal switching unit configured to switch between an image signal from said image processing unit and an image signal from an external device, and to output the selected signal to said image writing unit;

an image forming unit configured to visualize information on said image carrier with a developer for a plurality of colors, and to form an image on a transfer material;

an image signal conversion table configured to subject an image signal from said switching unit to gradation conversion and to output the image signal having been subjected to gradation conversion to said image writing unit;

a gradation pattern image signal generating unit configured to generate a plurality of gradation patterns to be recorded on said transfer material;

a unit configured to prepare and select an image signal conversion table according to a read signal read by said image reading unit from said gradation patterns recorded on the transfer material; and a detecting unit configured to detect a relation between a surface potential and a toner deposition rate on the image carrier; wherein an image signal conversion table for signals having been switched by the switching unit is changed according to a result of detection by said detecting unit and, gradation patterns generated by the image signal generating unit are changed according to the image signal conversion table for signals having been switched by the switching unit to form a gradation pattern.

5. An image forming apparatus according to claim 4 further comprising:

a light-sensing unit configured to detect a reflected light from a transmitting light through the gradation pattern visualized on the image carrier; wherein the relation between a surface potential and toner deposition rate on the image carrier is detected by said detecting unit according to a result of detection by said light-sensing unit.

6. An image forming apparatus according to claim 5 further comprising a surface potential detecting unit configured to detect a surface potential of a gradation density pattern; wherein the relation between a surface potential and toner deposition rate on the image carrier is detected according to a result of detection by the surface potential detecting unit as well as to a result of detection by said light-sensing unit, and a write value for a gradation pattern formed on the transfer material is changed according to the relation detected.

* * * * *